United States Patent
Stokes et al.

(10) Patent No.: US 11,531,083 B2
(45) Date of Patent: Dec. 20, 2022

(54) RANGING SYSTEMS AND METHODS WITH STAGGERED MULTICHANNEL TRANSDUCERS

(71) Applicant: Teledyne FLIR, LLC, Thousand Oaks, CA (US)

(72) Inventors: Paul Stokes, Fleet (GB); Patrick Lamontagne, Laval (CA); Pierre Poitevin, Laval (CA)

(73) Assignee: Teledyne FLIR, LLC, Thousand Oaks, CA (US)

( * ) Notice: Subject to any disclaimer, the term of this patent is extended or adjusted under 35 U.S.C. 154(b) by 230 days.

(21) Appl. No.: 16/690,308

(22) Filed: Nov. 21, 2019

(65) Prior Publication Data

US 2020/0088840 A1      Mar. 19, 2020

Related U.S. Application Data

(63) Continuation of application No. PCT/US2018/034775, filed on May 25, 2018.
(Continued)

(51) Int. Cl.
*G01S 7/03* (2006.01)
*G01S 7/28* (2006.01)
(Continued)

(52) U.S. Cl.
CPC .......... *G01S 7/032* (2013.01); *G01S 7/2813* (2013.01); *G01S 7/521* (2013.01); *G01S 13/89* (2013.01); *G01S 15/89* (2013.01)

(58) Field of Classification Search
CPC .... G01S 7/52047; G01S 7/032; G01S 7/2813; G01S 7/521; G01S 15/8915; G01S 15/8925; G01S 15/89; G01S 13/89
(Continued)

(56) References Cited

U.S. PATENT DOCUMENTS

| | | | | |
|---|---|---|---|---|
| 3,691,513 A | * | 9/1972 | Stedtnitz | G01S 13/60 367/137 |
| 3,800,273 A | * | 3/1974 | Rolle | G01S 15/42 367/113 |

(Continued)

FOREIGN PATENT DOCUMENTS

| | | |
|---|---|---|
| CA | 2789129 | 8/2011 |
| CN | 103837862 | 6/2014 |

(Continued)

OTHER PUBLICATIONS

Wasatch Photonics, "Gratings for Laser Pulse Compression", Wasatch Photonics, 2002, Retrieved on the Internet:<https://wasatchphotonics.com/product-category/gratings-and-diffractive-optics/gratings-for-laser-pulse-compression/>, 4 pages.

(Continued)

*Primary Examiner* — Erin F Heard
*Assistant Examiner* — Michael W Justice
(74) *Attorney, Agent, or Firm* — Haynes and Boone, LLP

(57) ABSTRACT

Techniques are disclosed for systems and methods to provide a staggered multichannel transducer in a ranging system configured to perform remote sensing. The staggered multichannel transducer may extend in a first direction and one or more transducer elements of the array may offset from the other transducer elements in a second direction perpendicular to the first direction. The staggered arrangement of the transducer elements may improve remote sensing performance to produce accurate remote sensing data and/or imagery. The staggered arrangement also may reduce a number of transducer elements used in the transducer array which reduce the cost and complexity of the transducer array. Further, the staggered arrangement in a linear transducer array also allows for two-dimensional beam forming.

20 Claims, 10 Drawing Sheets

Related U.S. Application Data

(60) Provisional application No. 62/514,718, filed on Jun. 2, 2017.

(51) Int. Cl.
  *G01S 7/521* (2006.01)
  *G01S 13/89* (2006.01)
  *G01S 15/89* (2006.01)

(58) Field of Classification Search
  USPC .............. 342/118, 81, 371, 154, 157, 379; 367/905, 138
  See application file for complete search history.

(56) References Cited

U.S. PATENT DOCUMENTS

| | | | |
|---|---|---|---|
| 3,811,129 A | 5/1974 | Holst | |
| 4,010,474 A | 3/1977 | Provencher | |
| 4,259,674 A | 3/1981 | Dragone | |
| 4,642,645 A | 2/1987 | Haupt | |
| 5,414,676 A | 5/1995 | Zehner | |
| 5,459,474 A | 10/1995 | Mattioli | |
| 5,911,692 A | 6/1999 | Hussain et al. | |
| 5,936,588 A | 8/1999 | Rao et al. | |
| 6,111,816 A | 8/2000 | Chiang et al. | |
| 6,292,433 B1 | 9/2001 | Gilbert et al. | |
| 6,366,238 B1 | 4/2002 | DeMore et al. | |
| 6,384,516 B1* | 5/2002 | Fraser | B06B 1/0622 310/334 |
| 6,436,048 B1 | 8/2002 | Pesque et al. | |
| 6,469,422 B2* | 10/2002 | Fraser | B06B 1/0622 310/334 |
| 6,496,158 B1 | 12/2002 | Ksienski | |
| 6,509,871 B2* | 1/2003 | Bevington | H01Q 21/22 342/357.65 |
| 6,676,602 B1 | 1/2004 | Barnes et al. | |
| 6,716,174 B1 | 4/2004 | Li | |
| 6,783,497 B2* | 8/2004 | Grenon | A61B 8/12 600/459 |
| 6,795,018 B2 | 9/2004 | Guo | |
| 7,207,942 B2 | 4/2007 | Ustuner | |
| 7,298,333 B2 | 11/2007 | Iluz et al. | |
| 7,887,486 B2 | 2/2011 | Ustuner | |
| 8,049,660 B2 | 11/2011 | Mizutani | |
| 8,238,588 B2* | 8/2012 | Meyer | H04R 1/403 381/386 |
| 8,254,654 B2 | 8/2012 | Yen | |
| 8,390,181 B2* | 3/2013 | Cerofolini | B06B 1/0622 310/369 |
| 9,033,888 B2 | 5/2015 | Brown et al. | |
| 9,947,309 B2* | 4/2018 | Stokes | G10K 11/006 |
| 10,024,957 B2* | 7/2018 | Horner | G01S 7/52003 |
| 10,114,119 B2* | 10/2018 | Horner | G01S 15/89 |
| 10,416,307 B2* | 9/2019 | Stokes | G01S 15/86 |
| 10,436,887 B2* | 10/2019 | Stokes | G01S 7/6245 |
| 2002/0105464 A1* | 8/2002 | Bevington | G10K 11/34 342/376 |
| 2002/0130591 A1* | 9/2002 | Fraser | B06B 1/0622 310/334 |
| 2003/0220554 A1* | 11/2003 | Grenon | A61B 8/12 600/407 |
| 2006/0204022 A1* | 9/2006 | Hooley | H04R 1/403 381/117 |
| 2007/0173722 A1 | 7/2007 | Ustuner | |
| 2007/0276240 A1* | 11/2007 | Rosner | A61B 8/4494 600/437 |
| 2009/0238383 A1* | 9/2009 | Meyer | H04R 1/403 381/182 |
| 2009/0270735 A1* | 10/2009 | Cerofolini | B06B 1/0637 600/459 |
| 2014/0031693 A1* | 1/2014 | Solek | A61B 8/145 600/447 |
| 2015/0208251 A1 | 7/2015 | Lim et al. | |
| 2015/0253419 A1 | 9/2015 | Alland | |
| 2015/0294660 A1* | 10/2015 | Stokes | F16M 11/10 367/173 |
| 2016/0282450 A1 | 9/2016 | Kishigami et al. | |
| 2016/0285172 A1 | 9/2016 | Kishigami et al. | |
| 2016/0325814 A1 | 11/2016 | Antao et al. | |
| 2016/0341827 A1* | 11/2016 | Horner | G01S 15/89 |
| 2016/0380360 A1 | 12/2016 | Gruener et al. | |
| 2017/0059698 A1* | 3/2017 | Stokes | G01S 15/89 |
| 2017/0059705 A1* | 3/2017 | Stokes | G01S 7/521 |
| 2017/0082739 A1* | 3/2017 | Horner | G01S 7/526 |
| 2018/0092621 A1* | 4/2018 | Duerr | A61B 8/42 |
| 2018/0092622 A1* | 4/2018 | Duerr | A61B 8/42 |
| 2018/0092630 A1* | 4/2018 | Duerr | G01S 15/8984 |
| 2021/0030391 A1* | 2/2021 | Duerr | A61B 8/04 |

FOREIGN PATENT DOCUMENTS

| | | | | |
|---|---|---|---|---|
| CN | 103985970 | | 8/2014 | |
| CN | 104808200 | | 7/2015 | |
| CN | 105334508 | | 2/2016 | |
| CN | 105738895 | | 7/2016 | |
| DE | 102010002474 | | 9/2010 | |
| EP | 0947852 | | 6/1999 | |
| EP | 2963442 | | 1/2016 | |
| EP | 3109939 | | 12/2016 | |
| JP | 2012100055 A | * | 5/2012 | |
| KR | 20120043512 A | * | 5/2012 | ............. G01S 15/86 |
| WO | WO-2015183754 A1 | * | 12/2015 | ......... G01S 7/52034 |

OTHER PUBLICATIONS

Kumar et al., "Grating lobe and Sidelobe Suppression using Multi-Objective Optimization Techniques", International Conference on Communication and Signal Processing, Apr. 2-4, 2015, India.

Akinlolu Ponnle et al., "Suppression of Grating Lobe Artifacts in Ultrasound Images Formed from Diverging Transmitting Beams by Modulation of Receiving Beams", Oct. 2011, Ultrasound in Med. & Biol., vol. 39, No. 4, 11 pages.

Pompei et al., "Phased Array Element Shapes for Suppressing grating lobes", Cambridge, Massachusetts, Aug. 7, 2001, Retrieved on the Internet: <https://convexoptimization.com/TOOLS/Pompei2002.pdf>, 9 pages.

Wikipedia, "Side lobe", Retrieved on the Internet:<https://en.wikipedia.org/wiki/Side_lobe>, Sep. 26, 2019, 2 pages.

Suarez et al., "Experimental Validation of Linear Aperiodic Array for Grating Lobe Suppression", Progress in Electromagnetics Research C, vol. 26, 193-203, Jan. 2012, 11 pages.

Kavindra Krishna, "Suppression of Grating Lobes in DSA Using Principle of Pattern Multiplication", Research Scholar AMU, Retrieved on the Internet: <https://www.slideshare.net/kavindrakrishna/suppression-of-grating-lobes>, Jun. 4, 2015, 10 pages.

Alshammary et al., "Grating Lobe Suppression in Rotationally Tiled Arrays", Glasgow, Scotland, May 18, 2017, Retrieved on the Internet: <https://strathprints.strath.ac.uk/59126/1/Alshammary_etal_EuCAP2017_Grating_lobe_supression_inrotationally_tiled_arrays.pdf>, 4 pages.

Gao et al., "A Robust Range Grating Lobe Suppression Method Based on Image Contrast for Stepped-Frequency SAR", Dec. 6, 2016, Retrieved on the Internet: <https://www.ncbi.nlm.nih.gov/pmc/articles/PMC5191047/>, 18 pages.

Reddy et al., "Grating Lobe Suppression with Element Count Optimization in Planar Antenna Array", Feb. 6, 2015, Retrieved on the Internet: <https://file.scirp.org/pdf/JEMAA_2015022615341314.pdf>, 10 pages.

Bertl et al., "Suppression of grating lobes for MMW sparse array setups", Adv. Radio Sci., 9, 67-71, 2011, <https://www.adv-radio-sci.net/9/67/2011/ars-9-67-2011.pdf>, 5 pages.

* cited by examiner

Table 1

| Array Directivity Responses | | | | | |
|---|---|---|---|---|---|
| | SteerHor=0 SteerVert=0 | SteerHor=30 SteerVert=0 | SteerHor=60 SteerVert=0 | SteerHor=0 SteerVert=20 | Transducer Array (Tx or Rx) |
| (a) Linear Transmitter or Receiver | | | | | Linear Channels (8 Channels) 445 ↔ ↕ 465 |
| (b) Linear Double Transmitter or Receiver | | | | | Double Linear Channels (16 Channels) |
| (c) Linear Staggered Transmitter or Receiver | | | | | Linear Staggered Channels (8 Channels) |
| (d) Linear Receiver With Wide Spacing | | | | | Linear Receiver With Wide Spacing (4 Channels) Rx Rx Rx Rx |

FIG. 4A

RANGING SYSTEMS AND METHODS WITH STAGGERED MULTICHANNEL TRANSDUCERS

CROSS-REFERENCE TO RELATED APPLICATIONS

This application is a continuation of International Patent Application No. PCT/US2018/034775 filed May 25, 2018 and entitled "RANGING SYSTEMS AND METHODS WITH STAGGERED MULTICHANNEL TRANSDUCERS," which is incorporated herein by reference in its entirety International Patent Application No. PCT/US2018/034775 filed May 25, 2018 claims priority to and the benefit of U.S. Provisional Patent Application No. 62/514,718 filed Jun. 2, 2017 and entitled, "RANGING SYSTEMS AND METHODS WITH STAGGERED MULTICHANNEL TRANSDUCERS," which is hereby incorporated by reference in its entirety.

TECHNICAL FIELD

One or more embodiments of the invention relate generally to ranging systems and more particularly, for example, to systems and methods for providing remote sensing imagery.

BACKGROUND

Ranging systems, such as radar, sonar, lidar, and/or other remote sensing systems, are often used to assist in navigation by producing data and/or imagery of the environment surrounding a mobile structure, such as imagery representing above-surface and/or subsurface features critical to navigation of aircraft, ground vehicles, or watercraft. Conventional ranging systems often include a display configured to provide remote sensing imagery to a user.

Higher quality remote sensing imagery has conventionally been associated with relatively large and unwieldy transducer assemblies. Ranging systems incorporating such assemblies are typically expensive and cannot be used with a large portion of non-commercial watercraft. At the same time, consumer market pressures and convenience dictate smaller and easier to use systems that include more features and produce higher quality resulting imagery. Thus, there is a need for an improved transducer assembly to provide compact yet feature-rich and flexible-use ranging systems, particularly in the context of providing relatively high quality enhanced sensing data and/or imagery.

SUMMARY

Techniques are disclosed for systems and methods to provide accurate and compact ranging systems for remote sensing. In particular, a ranging system may include a staggered multichannel transducer with multiple transmitting and/or receiving transducer elements arranged in a staggered pattern. The staggered pattern allows a linear array to perform two-dimensional beam forming without necessitating a full two dimensional transducer array, thus reducing the number of transducer elements needed to provide corresponding three dimensional imagery. Further, the combination of different staggered patterns in the transmitter and receiver arrays can be used to reducing grating lobes and/or other detrimental effects typically associated with relatively sparse or widely spaced transducer array arrangements.

In one embodiment, a ranging system may include a transducer array extending in a first direction and configured to perform remote sensing. The transducer array may include transducer elements arranged in a staggered pattern in which one or more of the transducer elements are offset from the other transducer elements in a second direction perpendicular to the first direction.

In another embodiment, a method may include receiving return signals by a staggered multichannel transducer of a ranging system, forming one or more signal return beams based, at least in part, on the return signals, and generating remote sensing image data based, at least in part, on the signal return beams.

In still another embodiment, a method may include providing a multichannel transducer substrate, positioning transducer elements in a staggered pattern on the multichannel transducer substrate, securing the transducer elements on the multichannel transducer substrate in the staggered pattern, and providing connections to the transducer elements.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 4A-B show Tables illustrating simulated directivity responses associated with different transducer element arrangements for a multichannel transducer of a ranging system in accordance with embodiments of the disclosure.

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, ranging systems and methods may advantageously include a staggered multichannel transducer in which transducer elements are arranged in a staggered pattern. Embodiments of the present disclosure can reliably produce high quality imagery while reducing a number of transducer elements in the transducer array, which reduces system cost associated with beamforming electronics and processing resources. Further, a linear array with elements arranged according a staggered pattern allows for two-dimensional beamforming and imaging/sensing. Such embodiments result in improved performance, cost saving, and reduction in complexity and size of transducer arrays used in ranging sensor systems.

Figure 1A:
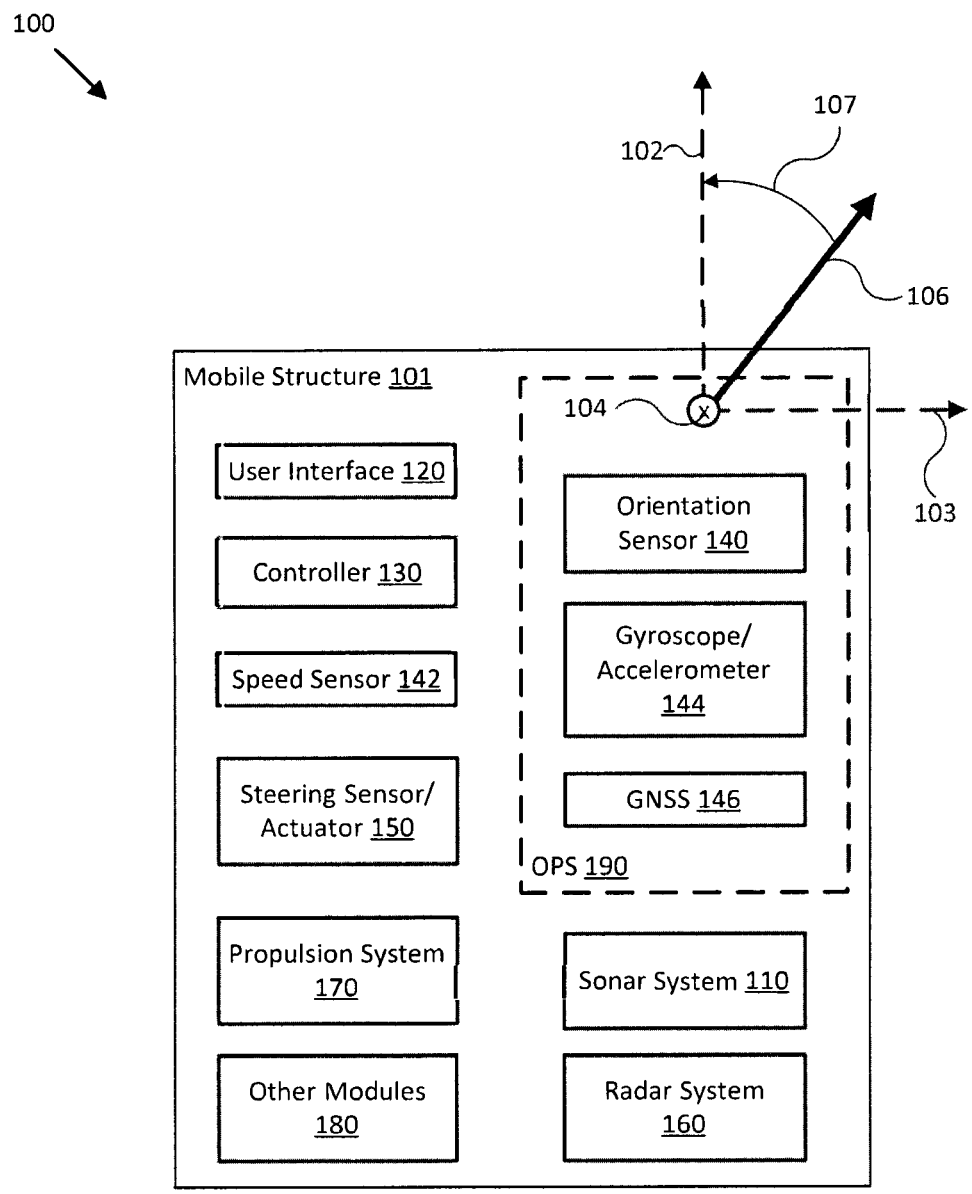
FIG. 1A illustrates a block diagram of a ranging system in accordance with an embodiment of the disclosure.

FIG. 1A illustrates a block diagram of detection and ranging system 100 in accordance with an embodiment of the disclosure. In various embodiments, system 100 may be configured to detect a target and/or determine a range to a target using a sonar system 110, a radar system 160, and/or other types of ranging systems, as described herein. In this regard, sonar system 110 and/or radar system 160 may be configured to transmit a ranging system signal (e.g., a pulse or beam or a series of pulses/pulse train) towards a target and receive at least a portion of the transmitted signal reflected from the target as a ranging signal return. System 100 may then process the ranging signal return to de-convolve the target (e.g., identify, separate, or reconstruct a signal indicative of the return reflected from the target and/or a direction corresponding to the relative position of the target).

In some embodiments, system 100 may be configured to measure an orientation, a position, an acceleration, and/or a speed of sonar system 110, radar system 160, user interface 120, and/or mobile structure 101 using any of the various sensors of OPS 190 and/or system 100. System 100 may then use these measurements to generate accurate image data from ranging data provided by sonar system 110, radar system 160, and/or other ranging systems or types of ranging systems (e.g., other modules 180), according to a desired operation of system 100 and/or mobile structure 101. In some embodiments, system 100 may display resulting imagery to a user through user interface 120, and/or use the sonar data, radar data, orientation and/or sensor data, and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide ranging data and/or imagery for a particular type of mobile structure 101, such as a drone, a watercraft, an aircraft, a robot, a vehicle, and/or other types of mobile structures, including any platform designed to move through or under the water, through the air, and/or on a terrestrial surface. In one embodiment, system 100 may include one or more of a sonar system 110, a radar system 160, a user interface 120, a controller 130, an OPS 190 (e.g., including an orientation sensor 140, a gyroscope/accelerometer 144, and/or a global navigation satellite system (GNSS) 146), a speed sensor 142, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope 144 and accelerometer 145). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, True North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or other module of sonar system 110, OPS 190, orientation sensor 140, and/or user interface 120, for example) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 and referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein.

For example, in various embodiments, sonar system 110 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943,170 filed Feb. 21, 2014 and entitled "MODULAR SONAR TRANSDUCER ASSEMBLY SYSTEMS AND METHODS", both of which are hereby incorporated by reference in their entirety. In other embodiments, sonar system 110 may be implemented according to other sonar system arrangements that can be used to detect objects within a water column and/or a floor of a body of water.

More generally, sonar system 110 may be configured to emit one, multiple, or a series of acoustic beams (e.g., beamformed or direct ranging sensor pulses having audio frequency waves as a carrier), receive corresponding acoustic returns/echoes, and convert the acoustic returns into sonar data and/or imagery (e.g., ranging system image data), such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three dimensional waypoints, increase sonar data and/or imagery quality, and/or provide highly accurate bathymetry data, as described herein.

For example, fisherman desire highly detailed and accurate information and/or imagery of underwater structure and mid water targets (e.g., fish). Conventional sonar systems can be expensive and bulky and typically cannot be used to provide relatively accurate and/or distortion free underwater views, as described herein. Embodiments of sonar system 110 include low cost multichannel sonar systems that can be configured to produce detailed two and three dimensional sonar data and/or imagery. In some embodiments, sonar system 110 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, sonar system 110 may be configured to provide many different display views from a variety of selectable perspectives, including down imaging, side imaging, and/or two/three dimensional imaging, using a selection of configurations and/or processing methods, as described herein. In some embodiments, sonar system 110 may be implemented with a single transducer assembly housing incorporating one or two multichannel transducers and/or associated electronics. In such embodiments, sonar system 110 may be configured to transmit acoustic beams using a transmitter channel and/or element of a multichannel transducer, receive acoustic returns using multiple receiver channels and/or elements of the multichannel transducer, and to perform beamforming and/or interferometry processing on the acoustic returns to produce two and/or three dimensional sonar imagery. In some embodiments, one or more sonar transmitters of sonar system 110 may be configured to use CHIRP transmissions to improve range resolution and hence reduce ambiguities typically inherent in interferometry processing techniques.

In various embodiments, sonar system 110 may be implemented with its own dedicated OPS 190, which may include various orientation and/or position sensors (e.g., similar to orientation sensor 140, gyroscope/accelerometer 144, and/or GNSS 146) that may be incorporated within the transducer assembly housing to provide three dimensional orientations and/or positions of the transducer assembly and/or transducer(s) for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of sonar data and/or user-defined waypoints remote from mobile system 101. Similarly, sonar system 110 may be configured to provide accurate two and/or three dimensional aggregation and/or display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GNSS 146), sonar system 110 may be configured to generate accurate and detailed bathymetric views of a floor of a body of water.

In embodiments where sonar system 110 is implemented with an orientation and/or position sensor, sonar system 110 may be configured to store such location/position information along with other sensor information (acoustic returns, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, mobile structure 101 may be located in an area identified on an chart using position data, a user may have selected a user setting for a configuration of sonar system 110, and controller 130 may be configured to control an actuator and/or otherwise implement the configuration for sonar system 110 (e.g., to set a particular orientation). In still another embodiment, controller 130 may be configured to receive orientation measurements for mobile structure 101. In such embodiment, controller 130 may be configured to control the actuators associated with the transducer assembly to maintain its orientation relative to, for example, the mobile structure and/or the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, OPS 190 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110.

Radar system 160 may be implemented as one or more electrically and/or mechanically coupled controllers, transmitters, receivers, transceivers, signal processing logic devices, various electrical components, transducer elements (e.g., antenna elements) of various shapes and sizes, multichannel transducers/transducer modules, radar assemblies, assembly brackets, mast brackets, and/or various actuators adapted to adjust orientations of any of the components of radar system 160, as described herein. For example, in various embodiments, radar system 160 may be implemented according to various radar system arrangements (e.g., detection and ranging system arrangements) that can be used to detect features of and determine a distance to objects on or above a terrestrial surface or a surface of a body of water.

More generally, radar system 160 may be configured to emit one, multiple, or a series of radar beams (e.g., beamformed or direct ranging sensor pulses having a radio frequency wave as a carrier), receive corresponding radar returns/echoes, and convert the radar returns into radar data and/or imagery (e.g., ranging image data), such as one or more intensity plots and/or aggregation of intensity plots indicating a relative position, orientation, and/or other characteristics of structures, weather phenomena, waves, other mobile structures, surface boundaries, and/or other objects reflecting the radar beams back at radar system 160. Radar system 160 may be configured to provide such data and/or imagery to user interface 120 for display to a user, for example, or to controller 130 for additional processing, as described herein. Moreover, such data may be used to generate one or more charts corresponding to AIS data, ARPA data, MARPA data, and or one or more other target tracking and/or identification protocols.

In some embodiments, radar system 160 may be implemented using a compact design, where multiple radar transducers, sensors, and/or associated processing devices are located within a single radar assembly housing that is configured to interface with the rest of system 100 through a single cable providing both power and communications to and from radar system 160. In some embodiments, radar system 160 may include orientation and/or position sensors (e.g., OPS 190) configured to help provide two or three dimensional waypoints, increase radar data and/or imagery quality, and/or provide highly accurate radar image data, as described herein.

For example, fishermen desire highly detailed and accurate information and/or imagery of local and remote structures and other watercraft. Conventional radar systems can be expensive and bulky and typically cannot be used to provide relatively accurate and/or distortion free radar image data, as described herein. Embodiments of radar system 160 include low cost multichannel (e.g., synthetic aperture) radar systems that can be configured to produce detailed two and three dimensional radar data and/or imagery. In some embodiments, radar system 160 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, radar system 160 may be implemented with its own dedicated OPS 190, which may include various orientation and/or position sensors (e.g., similar to orientation sensor 140, gyroscope/accelerometer 144, and/or GNSS 146) that may be incorporated within the radar assembly housing to provide three dimensional orientations and/or positions of the radar assembly and/or transducer(s) for use when processing or post processing radar data for display. The sensor information can be used to correct for movement of the radar assembly between beam emissions to provide improved alignment of corresponding radar returns/samples, for example, and/or to generate imagery based on the measured orientations and/or positions of the radar assembly/transducer. In other embodiments, an external orientation and/or position sensor can be used alone or in combination with an integrated sensor or sensors.

In embodiments where radar system 160 is implemented with a position sensor, radar system 160 may be configured to provide a variety of radar data and/or imagery enhancements. For example, radar system 160 may be configured to provide accurate positioning of radar returns remote from mobile system 101. Similarly, radar system 160 may be configured to provide accurate two and/or three dimensional aggregation and/or display of a series of radar data; without either orientation data or position data to help determine a track or heading, a radar system typically assumes a straight track, which can cause image artifacts and/or other inaccuracies in corresponding radar data and/or imagery. Additionally, when implemented with a position sensor, radar system 160 may be configured to generate accurate and detailed intensity plots of objects on a surface of a body of water.

In embodiments where radar system 160 is implemented with an orientation and/or position sensor, radar system 160 may be configured to store such location/position information along with other sensor information (radar returns, temperature measurements, text descriptions, altitude, mobile structure speed, and/or other sensor and/or control information) available to system 100. In some embodiments, controller 130 may be configured to generate a look up table so that a user can select desired configurations of radar system 160 for a particular location or to coordinate with some other sensor information. Alternatively, an automated adjustment algorithm can be used to select optimum configurations based on the sensor information.

For example, in one embodiment, mobile structure 101 may be located in an area identified on an chart using position data, a user may have selected a user setting for a configuration of radar system 160, and controller 130 may be configured to control an actuator and/or otherwise implement the configuration for radar system 160 (e.g., to set a particular orientation or rotation rate). In still another embodiment, controller 130 may be configured to receive orientation measurements for mobile structure 101. In such embodiment, controller 130 may be configured to control the actuators associated with the radar assembly to maintain its orientation relative to, for example, the mobile structure and/or the water surface, and thus improve the displayed radar images (e.g., by ensuring consistently oriented radar beams and/or proper registration of a series of radar returns). In various embodiments, controller 130 may be configured to control steering sensor/actuator 150 and/or propulsion system 170 to adjust a position and/or orientation of mobile structure 101 to help ensure proper registration of a series of radar returns, radar data, and/or radar imagery.

Although FIG. 1A shows various sensors and/or other components of system 100 separate from radar system 160, in other embodiments, any one or combination of sensors and components of system 100 may be integrated with a radar assembly, an actuator, a transducer module, and/or other components of radar system 160. For example, OPS 190 may be integrated with an antenna platform of sonar system 110 and be configured to provide measurements of an absolute and/or relative orientation (e.g., a roll, pitch, and/or yaw) of the antenna to controller 130 and/or user interface 120, both of which may also be integrated with radar system 160.

As used herein, the term "transducer" may refer generally to a device configured to convert electrical signals into ranging system transmission signals and to convert ranging system transmission signals into electrical signals, including sonar transducers or transducer elements, radar antennas or antenna elements, and/or other ranging system transmitter and/or sensor/receiver elements.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of sonar system 110, radar system 160, and/or mobile structure 101, for example, and display the sensor information as feedback to a user.

In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110 or radar system 160) overlaid on a geographical map, which may include one or more graphs indicating a corresponding time series of actuator control signals, sensor information, and/or other sensor and/or control signals, including sonar, radar, and/or other ranging image data.

In some embodiments, user interface 120 may be adapted to accept user input including a user-defined target heading, route, and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude/angular frequency for an actuated device (e.g., sonar system 110, radar system 160) coupled to mobile structure 101, for example, and to generate control signals for adjusting an orientation or rotation of the actuated device according to the target attitude/angular frequency. More generally, user interface 120 may be adapted to display sensor information to a user, for example, and/or to transmit sensor information and/or user input to other user interfaces, sensors, or controllers of system 100, for instance, for display and/or further processing. In one embodiment, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of mobile structure 101.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, radar system 160, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, radar system 160, mobile structure 101, and/or system 100.

OPS 190 may be implemented as an integrated selection of orientation and/or position sensors (e.g., orientation sensor 140, accelerometer/gyroscope 144, GNSS 146) that is configured to provide orientation and/or position data in relation to one or more elements of system 100. For example, embodiments of OPS 190 may be integrated with mobile structure 101, sonar system 110, and/or radar system 160 and be configured to provide orientation and/or position data corresponding to a center of mass of mobile structure 101, a sonar transducer of sonar system 110, and/or a radar antenna/transducer of radar system 160. Such measurements may be referenced to an absolute coordinate frame, for example, or may be referenced to a coordinate frame of OPS 190 and/or any one of the individual sensors integrated with OPS 190. More generally, OPS 190 provides a single, relatively compact integrated device that can be replicated throughout various elements of system 100, which in some embodiments may include a single/simplified interface for data and/or power. In various embodiments, the coordinate frames for one or more of the orientation and/or position sensors integrated into OPS 190 may be referenced to each other (e.g., to a single coordinate frame for OPS 190), such as at time of manufacture, to reduce or eliminate a need to determine coordinate frame transformations to combine data from multiple sensors of OPS 190 during operation of system 100.

Orientation sensor 140 may be implemented as one or more of a compass, float, accelerometer, magnetometer, and/or other digital or analog device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example. In various embodiments, orientation sensor 140 may be implemented and/or operated according to any of the systems and methods described in International Application PCT/US14/38286 filed May 15, 2014 and entitled "AUTOMATIC COMPASS CALIBRATION SYSTEMS AND METHODS", which is hereby incorporated by reference in its entirety.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GNSS 146 may be implemented as a global navigation satellite system receiver, such as a GNSS receiver, and/or other device capable of determining absolute and/or relative position of mobile structure 101 (e.g., or an element of mobile structure 101, such as sonar system 110 radar system 160, and/or user interface 120) based on wireless signals received from space-born and/or terrestrial sources, for example, and capable of providing such measurements as sensor signals that may be communicated to various devices of system 100. More generally, GNSS 146 may be implemented by any one or combination of a number of different GNSSs. In some embodiments, GNSS 146 may be used to determine a velocity, speed, COG, SOG, track, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering or trim mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101.

Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example.

In other embodiments, other modules 180 may include one or more actuated devices (e.g., spotlights, infrared illuminators, cameras, radars, sonars, lidars, other ranging systems, and/or other actuated devices) coupled to mobile structure 101, where each actuated device includes one or more actuators adapted to adjust an orientation of the device, relative to mobile structure 101, in response to one or more control signals (e.g., provided by controller 130). Other modules 180 may include a sensing element angle sensor, for example, which may be physically coupled to a radar assembly housing of radar system 160 and be configured to measure an angle between an orientation of an antenna/sensing element and a longitudinal axis of the housing and/or mobile structure 101. Other modules 180 may also include a rotating antenna platform and/or corresponding platform actuator for radar system 160. In some embodiments, other modules 180 may include one or more Helmholtz coils integrated with OPS 190, for example, and be configured to selectively cancel out one or more components of the Earth's magnetic field.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein. Similarly, the same or similar components may be used to create a radar pulse (e.g., a transmission control signal and/or a digital shaping control signal), convert the radar pulse to an excitation signal (e.g., a shaped or unshaped transmission signal) and transmit it to a radar antenna to produce a radar beam, receive a radar return (e.g., an electromagnetic wave received by the radar antenna and/or corresponding electrical signals from the radar antenna), convert the radar return to radar return data, and/or store sensor information, configuration data, and/or other data corresponding to operation of a radar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110, radar system 160, and/or other sensors of system 100 to/from a coordinate frame of orientation sensor 140 and/or mobile structure 101, for example. Furthermore, such parameters may be used to determine and/or calculate one or more adjustments to an orientation of sonar system 110 and/or radar system 160 that would be necessary to physically align a coordinate frame of sonar system 110 and/or radar system 160 with a coordinate frame of orientation sensor 140 and/or mobile structure 101, for example, or an absolute coordinate frame. Adjustments determined from such parameters may be used to selectively power adjustment servos/actuators (e.g., of sonar system 110, radar system 160, and/or other sensors or elements of system 100), for example, or may be communicated to a user through user interface 120, as described herein.

Figure 1B:
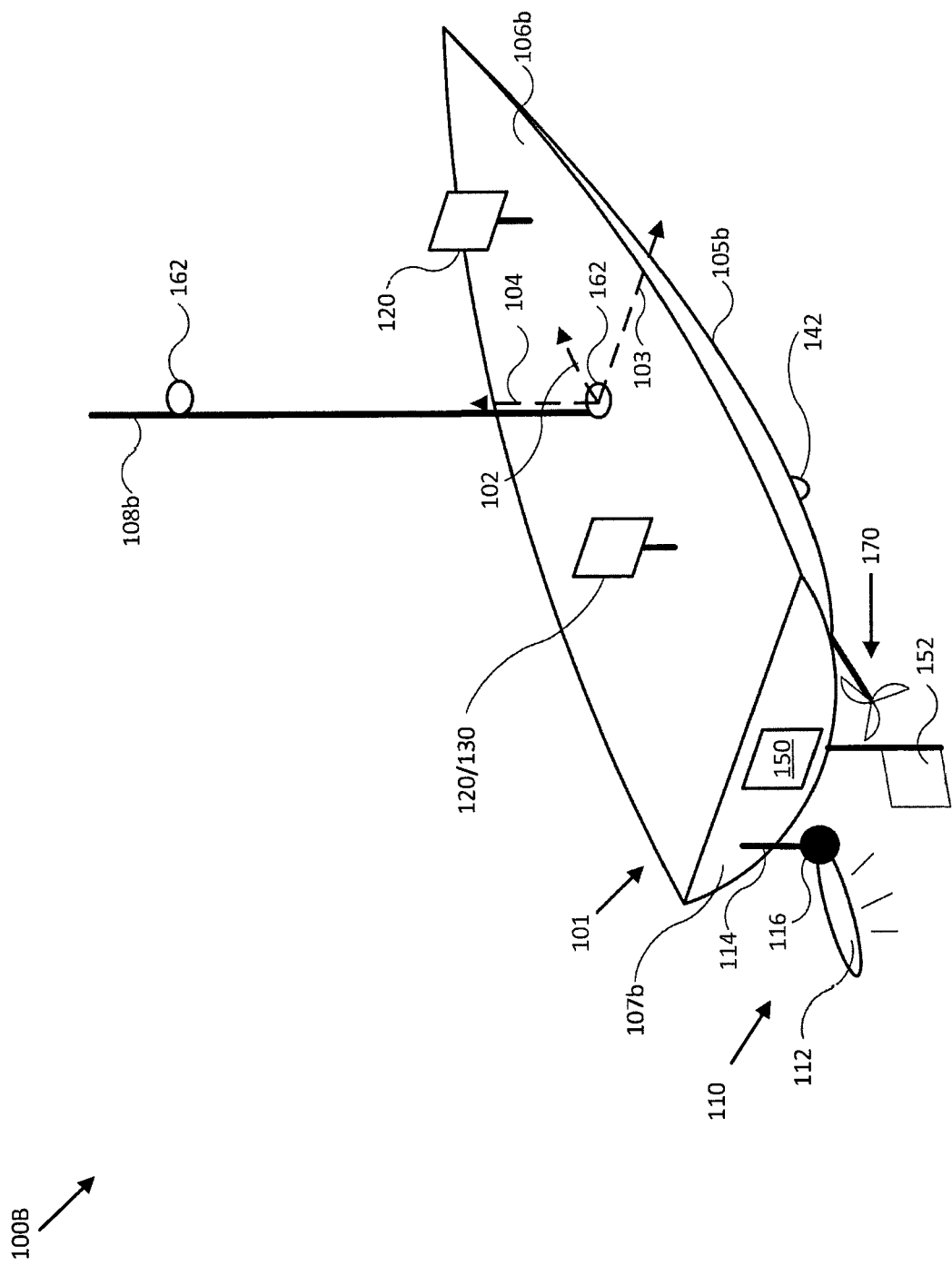
FIG. 1B illustrates a diagram of a ranging system in accordance with an embodiment of the disclosure.

FIG. 1B illustrates a diagram of system 100B in accordance with an embodiment of the disclosure. In the embodiment shown in FIG. 1B, system 100B may be implemented to provide sonar data and/or imagery for use with operation of mobile structure 101, similar to system 100 of FIG. 1B. For example, system 100B may include multichannel sonar system 110, integrated user interface/controller 120/130, secondary user interface 120, steering sensor/actuator 150, sensor clusters 162 (e.g., orientation sensor 140, gyroscope/accelerometer 144, and/or GNSS 146), and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and an actuated multichannel sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated multichannel sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein. In another embodiment, user interface/controller 120/130 may be configured to adjust an orientation of transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 106b) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor clusters 162. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2A:
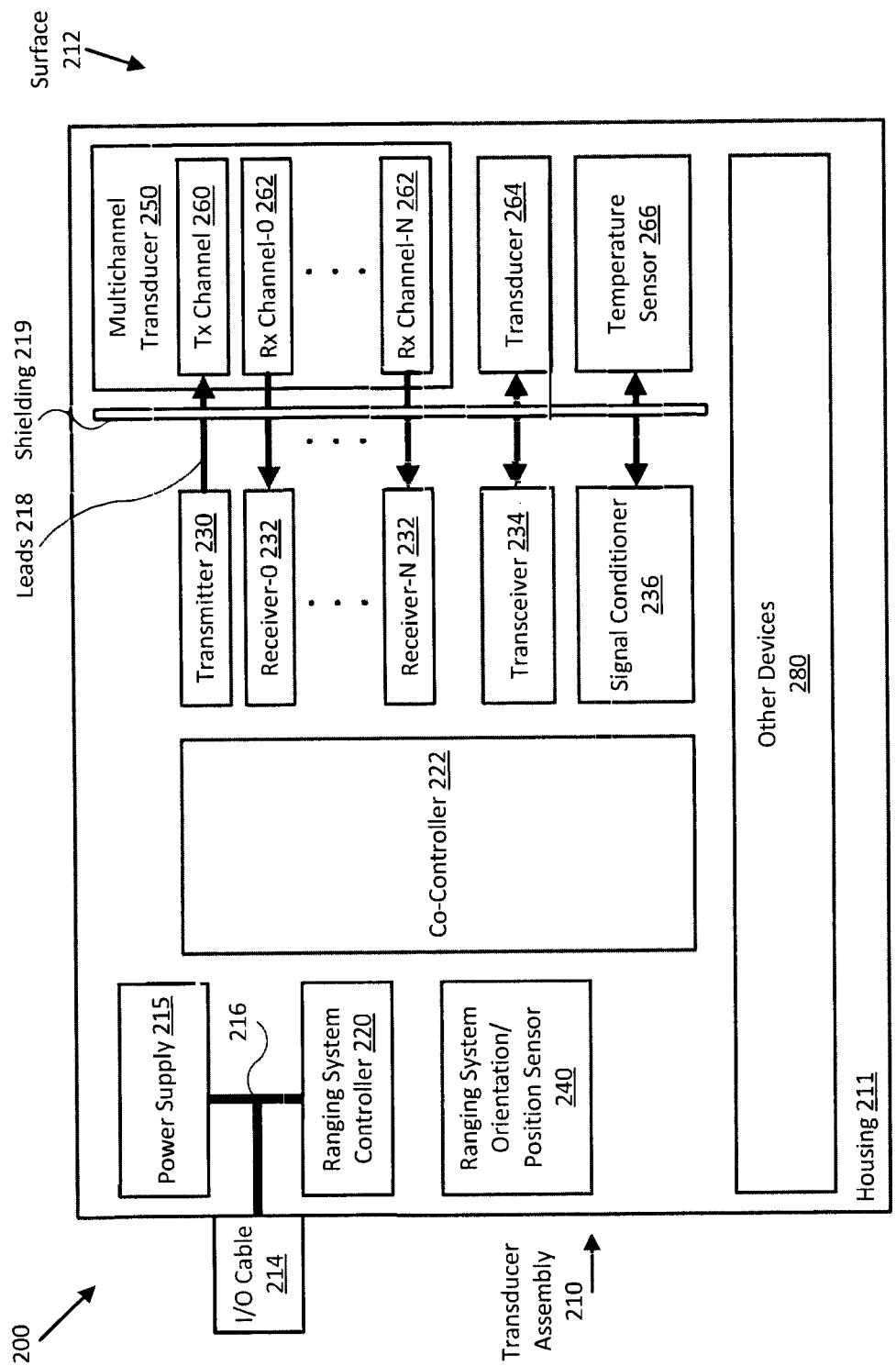
FIG. 2A illustrates a diagram of a ranging system in accordance with an embodiment of the disclosure.

FIG. 2A illustrates a diagram of a multichannel ranging system 200 in accordance with an embodiment of the disclosure. In the embodiment shown in FIG. 2A, multichannel ranging system 200 includes a transducer assembly 210 that can be coupled to a user interface (e.g., user interface 120 of FIG. 1A) and/or a power source through a single I/O cable 214. As shown, transducer assembly 210 may include one or more controllers (e.g., ranging system controller 220 and/or co-controller 222), transducers (e.g., multichannel transducer 250 and/or transducer 264), other sensors (e.g., orientation/position sensor 240 and/or water/air temperature sensor 266), and/or other devices facilitating operation of system 200 all disposed within a common housing 211. In other embodiments, one or more of the devices shown in FIG. 2A may be integrated with a remote user interface and communicate with remaining devices within transducer assembly 210 through one or more data and/or power cables similar to I/O cable 214.

Controller 220 and/or co-controller 222 may each be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of transducer assembly 210 and/or system 200, for example, similar to controller 130. In typical embodiments, controller 220 may be tasked with overseeing general operation of transducer assembly 210, generating sonar and/or radar (e.g., ranging) imagery from ranging data, correlating ranging data with ranging data/imagery, communicating operational parameters and/or sensor information with other devices through I/O cable 214, and/or other non-time-critical operations of system 200. In such embodiments, co-controller 222 may be implemented with relatively high resolution timing circuitry capable of generating digital transmission and/or sampling control signals for operating transmitters, receivers, transceivers, signal conditioners, and/or other devices of transducer assembly 210, for example, and other time critical operations of system 200, such as per-sample digital beamforming and/or interferometry operations applied to ranging signal returns from multichannel transducer 250, as described herein. In some embodiments, controller 220 and co-controller 222 may be integrated together, for example, or may be implemented in a distributed manner across a number of individual controllers.

Transmitter 230 may be implemented with one or more digital to analog converters (DACs), signal shaping circuits, filters, phase adjusters, signal conditioning elements, amplifiers, timing circuitry, logic devices, and/or other digital and/or analog electronics configured to accept digital control signals from co-controller 222 and to generate transmission signals to excite a transmitter channel/transducer element of multichannel transducer 250 (e.g., transmitter channel 260) to produce one or more ranging signal beams. In some embodiments, operation of transmitter 230 (e.g., amplification, frequency dependent filtering, transmit signal frequency, duration, shape, and/or timing/triggering, and/or other signal attributes), may be controlled (e.g., through use of various control signals) by co-controller 222, as described herein.

Each of receivers 232 (e.g., for N channels as shown) may be implemented with one or more analog to digital converters (ADCs), filters, phase adjusters, signal conditioning elements, amplifiers, timing circuitry, logic devices, and/or other digital and/or analog electronics configured to accept analog ranging signal returns from a corresponding receiver channel/transducer element of multichannel transducer 250 (e.g., receiver channels 262), convert the analog ranging signal returns into digital ranging signal returns, and provide the digital ranging signal returns to co-controller 222. In some embodiments, operation of each receiver 232 (e.g., amplification, frequency dependent filtering, basebanding, sample resolution, duration, and/or timing/triggering, and/or other ADC/signal attributes) may be controlled by co-controller 222. For example, co-controller 222 may be configured to use receivers 232 to convert an analog signal return into a digital signal return comprising one or more digital baseband transmissions that are then provided to co-controller 222. In various embodiments, receivers 232 may be configured to low-pass or otherwise filter, amplify, decimate, and/or otherwise process the analog and/or digital ranging signal returns (e.g., using analog and/or digital signal processing) prior to providing the digital ranging signal returns to co-controller 222. In other embodiments, receivers 232 may be configured to provide substantially unprocessed (e.g., raw) analog and/or digital ranging signal returns to co-controller 222 for further signal processing, as described herein. In further embodiments, transmitter 230 and one or more of receivers 232 may be integrated into a single transceiver.

In the embodiment shown in FIG. 2A, multichannel transducer 250 includes multiple transducer elements and/or transmitter/receiver channels that may be operated substantially independently of each other and be configured to emit ranging signal beams and receive ranging signal returns through emission surface 212 of housing 211. In some embodiments, multichannel transducer 250 may include a single transmitter channel 260 and, separately, multiple receiver channels 262. In other embodiments, multichannel transducer 250 may include multiple transmitter channels. In further embodiments, transmitter channel 260 may be implemented as both a transmitter channel and a receiver channel though use of a transceiver (e.g., similar to transceiver 234). In general, transmitter channel 260 may be implemented as one, two, or many separate transducer elements configured to produce one or more ranging signal beams. Each of receiver channels 262 may also be implemented as one, two, or many separate transducer elements, but configured to receive ranging signal returns. The effective volumetric shapes of the ranging signal beams and ranging signal returns may be determined by the shapes and arrangements of their corresponding transducer elements, as described herein. In various embodiments, the various channels of multichannel transducer 250 may be arranged to facilitate multichannel processing, such as beamforming, interferometry, inter-beam interpolation, and/or other types of multichannel processing used to produce sonar data and/or imagery.

For example, in one embodiment, multichannel transducer 250 may be implemented with multiple transmitter channels 260 arranged in a phased array to allow electronic steering of relatively narrow ranging signal beams (relative to those produced by a single transmitter channel 260) within a relatively wide range of transmission angles. In such embodiments, transducer assembly 210 may be configured to use such electronically steered beams to improve signal-to-noise in resulting sonar or radar data and/or imagery and/or to improve rejection of false targets detected in the corresponding ranging signal returns. A related and less complex embodiment could be a transmission array implemented without phasing such that the resulting ranging signal beam width can be adjusted by including or excluding transmitter channels and/or elements. For example, such embodiments could be used to alternate between operation with deep verses shallow water where the ranging signal beams could be switched between relatively narrow for deep water and relative wide for shallow water.

In some embodiments, transducer assembly 210 may be implemented with one or more additional transducers (e.g., transducer 264) separate from multichannel transducer 250, and serviced by separate transmitter/receiver electronics similar to transmitter 230 and/or receivers 232 (e.g., transceiver 234, which may include high voltage protection circuitry and/or transmit/receive switching to enable transmission and reception over the same leads 218). In various embodiments, operation of transceiver 234 and/or transducer 264 (e.g., and its constituent transducer elements) may be controlled by co-controller 222, similar to control of transmitter 230 and/or receivers 232 described herein. Typically, transceiver 234 and/or transducer 264 may be configured to produce acoustic beams adapted to reduce or eliminate interference with operation of multichannel transducer 250, such as by using a substantially different transmission frequency, timing, and/or shape, and/or by aiming the acoustic beams in a substantially non-interfering direction. In alternative embodiments, transceiver 234 and/or transducer 264 may be configured to generate ranging signal beams that produce ranging signal returns in multichannel transducer 250, similar to operation of transmitter 230 and transmitter channel 260, but from an oblique angle relative to multichannel transducer 250. In such embodiments, the oblique ranging signal returns may be used to generate sonar or radar (e.g., ranging) imagery with increased spatial differentiation and/or contrast between objects ensonified/irradiated by transducer assembly 210.

Transducer assembly 210 may include temperature sensor 266, which may be a digital and/or analog thermometer, sound cell, and/or other analog or digital device configured to measure a temperature near emission surface 212 and provide a corresponding sensor signal to signal conditioner 236 and/or co-controller 222. For example, signal velocity and/or attenuation in a medium (e.g., air or water) and/or transducing efficiency may be at least partially dependent on temperature, and so measured temperatures may be used to determine accurate measurements of spatial displacements (e.g., depths, object dimensions, and/or other spatial displacements) and/or densities of objects ranged by transducer assembly 210. Signal conditioner 236 may be one or more ADCs, filters, signal conditioning elements, amplifiers, timing circuitry, logic devices, and/or other digital and/or analog electronics configured to accept sensor signals from temperature sensor 266, filter, amplify, linearize, and/or otherwise condition the sensor signals, and provide the conditioned sensor signals to co-controller 222. In some embodiments, signal conditioner 236 may be configured to provide reference signals and/or other control signals to water temperature sensor 266 to enable operation of a particular type of water temperature sensor, for example, and may be controlled by co-controller 222.

In FIG. 2A, each of multichannel transducer 250, transducer 262, and/or temperature sensor 266 are coupled to their electronics over leads 218 and through shielding 219. In various embodiments, leads 218 and/or shielding 219 may be implemented as one or more shielded transmission lines configured to convey analog and/or digital signals between the various elements while shielding the transducers and/or temperature sensor from electromagnetic interference from each other, other elements of transducer assembly 210, and/or external sources. In some embodiments, leads 218 and shielding 219 may be integrated together to form a transmission system. For example, shielding 219 may be configured to provide a ground plane/return for signals conveyed by leads 218. In one embodiment, leads 218 may be implemented as a first conductive ribbon with multiple electrically isolated conductive traces (e.g., one for each channel/sensor), for example, and shielding 219 may be implemented as a second conductive ribbon with one or more relatively wide conductive traces electrically coupled to multiple channels of multichannel transducer 250, transducer 264, and/or water temperature sensor 266.

As shown, transducer assembly 210 may be implemented with system orientation/position sensor 240. Orientation/position sensor 240 may be implemented as one or more orientation sensors, GNSS sensors, differential GNSS sensors, orientation/position reference transducers and/or optical sensor (e.g., for actuators), and/or other sensors configured to measure a relative and/or absolute orientation and/or position of transducer assembly 210 and/or multichannel transducer 250 and provide such measurements to controller 220 and/or co-controller 222. In some embodiments, controller 220 and/or co-controller 222 may be configured to combine ranging data and/or imagery according to such measurements and/or measurements of an orientation and/or position of a coupled mobile structure to produce combined ranging data and/or imagery, such as multiple co-registered ranging images, for example, and/or three dimensional ranging images. In other embodiments, controller 220 and/or co-controller 222 may be configured to use orientation and/or position measurements of transducer assembly 210 and/or a coupled mobile structure to control one or more actuators (e.g., other devices 280) to adjust a position and/or orientation of transducer assembly 210 and ensonify/irradiate a particular position and/or orientation using transducer assembly 210 and/or multichannel transducer 250.

Other devices 280 may include other and/or additional sensors, sensor arrays, actuators, logic devices, communications modules/nodes, power distribution components, and/or user interface devices used to provide additional environmental information and/or configuration parameters, for example, and/or to adjust a position and/or orientation of transducer assembly 210. In some embodiments, other devices 280 may include a visible spectrum camera, an infrared camera, and/or other environmental sensors providing measurements and/or other sensor signals that can be displayed to a user and/or used by other devices of transducer assembly 210 (e.g., controller 220) to provide operational control of transducer assembly 210. In some embodiments, other devices 280 may include one or more actuators adapted to adjust an orientation (e.g., roll, pitch, and/or yaw) and/or a position (longitudinal, lateral, and/or vertical) of transducer assembly 210, multichannel transducer 250, and/or transducer 264, relative to a coupled mobile structure, in response to one or more control signals (e.g., provided by controller 220). In other embodiments, other devices 280 may include one or more brackets, such as a transom bracket, adapted to couple housing 211 to a mobile structure.

In various embodiments, transducer assembly 210 may be implemented in a single housing 211 with a single interface (e.g., I/O cable 214) to simplify installation and use. For example, I/O cable 214 may be implemented as a power-over-Ethernet (POE) cable supporting transmission of both communications and power between transducer assembly 210 and elements of a coupled mobile structure. Such communications and/or power may be delivered over leads 216 to power supply 215 and/or controller 220. Power supply 215 may be implemented as one or more power conditioners, line filters, switching power supplies, DC to DC converters, voltage regulators, power storage devices (e.g., batteries), and/or other power supply devices configured to receive power over leads 216 and/or distribute power to the various other elements of transducer assembly 210.

In various sensor applications, including sonar, radar, and/or other transmission signal-based sensor systems, it can be advantageous to be able to control the overall shape of the transmission signal (e.g., a burst of signals). From a processing perspective, shaping the transmission signal can reduce the number and magnitude of artifacts that typically occur along the range direction of the sensor system, which improves the quality and accuracy of resulting imagery and collateral processing, such as reducing false target detection. From a power amplifier design perspective, the shaping can reduce transients and associated issues with component saturation. From an electromagnetic compatibility (EMC) perspective, the shaping can reduce harmonics and associated spurious interference. Switching methods such as pulse width modulation (PWM) or pulse density modulation (PDM) require expensive fast switching components that can introduce unwanted harmonics and otherwise cause degradation in operation of a sensor system.

Figure 2B:
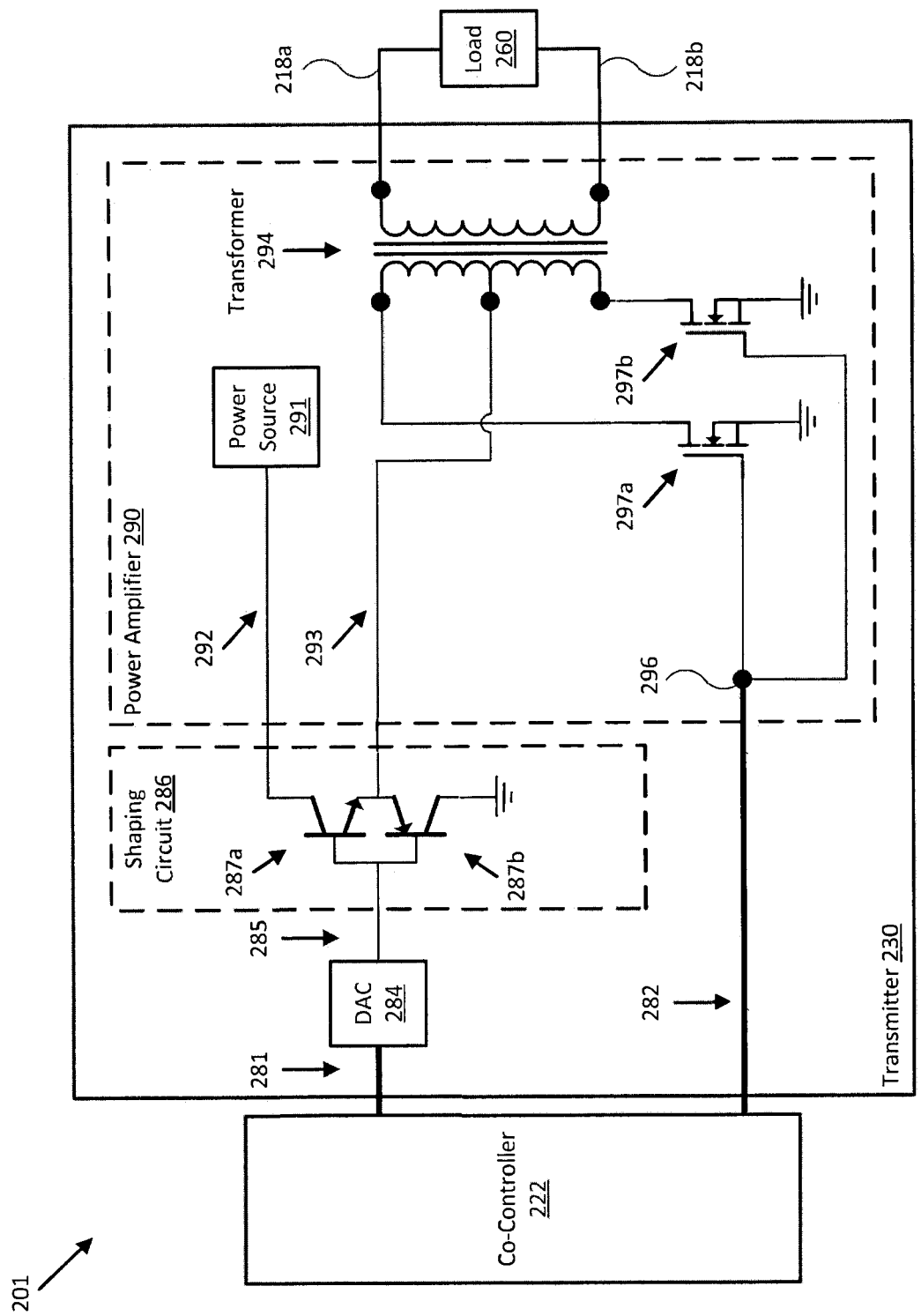
FIG. 2B illustrates a diagram of a ranging system transmitter in accordance with an embodiment of the disclosure.

FIG. 2B illustrates a diagram of ranging signal transmitter 230 configured to implement a digitally controlled method of shaping a transmission signal without a need for fast switching components, in accordance with an embodiment of the disclosure. In the embodiment shown in FIG. 2B, system 201 includes co-controller 222 configured to provide a digital shaping control signal over lead 281, and a transmission control signal over lead 282, to transmitter 230, which in turn is configured to provide a shaped transmission signal to load 260 over leads 218a-b.

As shown in FIG. 2B, transmitter 230 may be implemented with shaping circuit 286 (e.g., an emitter follower type circuit) that is operated by co-controller 222 through DAC 284. This arrangement digitally controls the proportion of a reference voltage (e.g., provided by power source 291 over lead 292) that is presented to power amplifier 290 over lead 293 and hence shapes the transmission signal (e.g., corresponding to a transmission control signal provided over lead 282 by co-controller 222).

For example, in general operation, co-controller 222 may be configured to provide two digital control signals to transmitter 230: a digital shaping control signal over lead 281, and a transmission control signal over lead 282. Lead 281 may provide the digital shaping control signal to DAC 284 of transmitter 230, and DAC 284 may be configured to convert the digital shaping control signal to a corresponding analog shaping control signal that is provided to shaping circuit 286 over lead 285. Shaping circuit 286 may be configured to convert a reference voltage (e.g., provided by power source 291 of power amplifier 290) to a shaped voltage corresponding to the analog shaping control signal, for example, and the shaped voltage may be provided to power amplifier 290 over lead 293. Power amplifier 290 may be configured to convert the shaped voltage into a shaped transmission signal corresponding to both the digital shaping control signal and the transmission control signal provided by co-controller 222. Power amplifier 290 may also be configured to provide the shaped transmission signal to load 260 over leads 218a-b, as shown.

DAC 284 may be implemented with one or more logic devices, filters, amplifiers, timing circuitry, and/or other digital and/or analog electronics configured to convert the digital shaping control signal to a corresponding analog shaping control signal and provide the analog shaping control signal to shaping circuit 286. In some embodiments, DAC 284 may be configured to use the digital shaping control signal directly to charge one or more capacitors that are then controllably discharged in order to convert the digital shaping control signal into a corresponding analog shaping control signal without reliance on a digital interface between co-controller 222 and DAC 284.

Shaping circuit 286 may be implemented with one or more transistors, filter arrangements, amplifier arrangements, and/or other digital and/or analog electronics configured to receive an analog shaping control signal, convert a reference voltage to a corresponding shaped voltage, and provide the shaped voltage to power amplifier 290. In one embodiment, shaping circuit 286 may be configured to provide current gain and/or act as an analog current amplifier for the analog shaping control signal. For example, shaping circuit 286 may be implemented with one or more bipolar junction transistors (BJTs) arranged in an emitter follower and/or voltage buffer circuit, as shown. In some embodiments, shaping circuit 286 may include NPN BJT 287a and PNP BJT 287b with coupled emitters and bases, with the bases coupled to receive the analog shaping control signal, one collector coupled to the reference voltage, and the other collector coupled to ground.

Power amplifier 290 may be implemented with one or more power sources, transformers, transistors, and/or other digital and/or analog electronics configured to receive a shaped voltage from shaping circuit 286 and convert the shaped voltage into a corresponding shaped transmission signal. In some embodiments, power amplifier 290 may be implemented with power source 291 configured to supply a reference voltage and sufficient backing current to shaping circuit 286 in order to generate a shaped transmission signal across leads 218a-b using the shaped voltage supplied by shaping circuit 286, as described herein.

In one embodiment, power amplifier 290 may include transformer 294 and current switches 297a-b all configured to convert a shaped voltage provided over lead 293 and a transmission control signal provided over lead 282 into a corresponding shaped transmission signal. In such embodiments, transformer 294 may be implemented with a primary winding coupled to the shaped voltage and current switches 297a-b, and a secondary winding coupled to leads 218a-b. The primary and secondary windings may have the same or a different number of windings, for example, and the number of windings may depend on the expected currents and loads and may be configured to maximize the power delivered to load 260. The primary winding may be center tapped, for example, or may be tapped off-center to tune transmitter 230 to maximize the power delivered to load 260, and the tap may be coupled to the shaped voltage as shown. Ends of the primary winding may be coupled to switches 297a-b, which may be controlled by co-controller 222 using the transmission control signal provided over lead 282.

In one embodiment, the transmission control signal may include a positive signal component and a negative signal component transmitted on different conductors of lead 282. The different conductors may be split at node 296 and each coupled to control leads of current switches 297a-b. In some embodiments, current switches 297a-b may be implemented from one or more MOSFETs, such as one or more N-channel inductive channel MOSFETs, for example, and the control leads may correspond to gates of the MOSFETs. In various embodiments, a positive voltage at a control lead of either current switch 297a-b causes a first current to pass through the primary winding of transformer 294 from the tap to the top or bottom end and then to ground, and the amount of first current is determined, at least in part, by the shaped voltage provided by shaping circuit 286, as shown and described. The first current induces a second current in the secondary windings that in turn produces a corresponding second voltage across load 260. The amount and polarity of the second current and voltage are determined, at least in part, by the amount and polarity of the first current, which is in turn determined by the shaped voltage and operation of one of current switches 297a-b. Thus, when presented with a shaped voltage and a transmission control signal, power amplifier 290 converts the shaped voltage into a shaped transmission signal corresponding to both the digital shaping control signal and the transmission control signal provided by co-controller 222.

Figure 3:
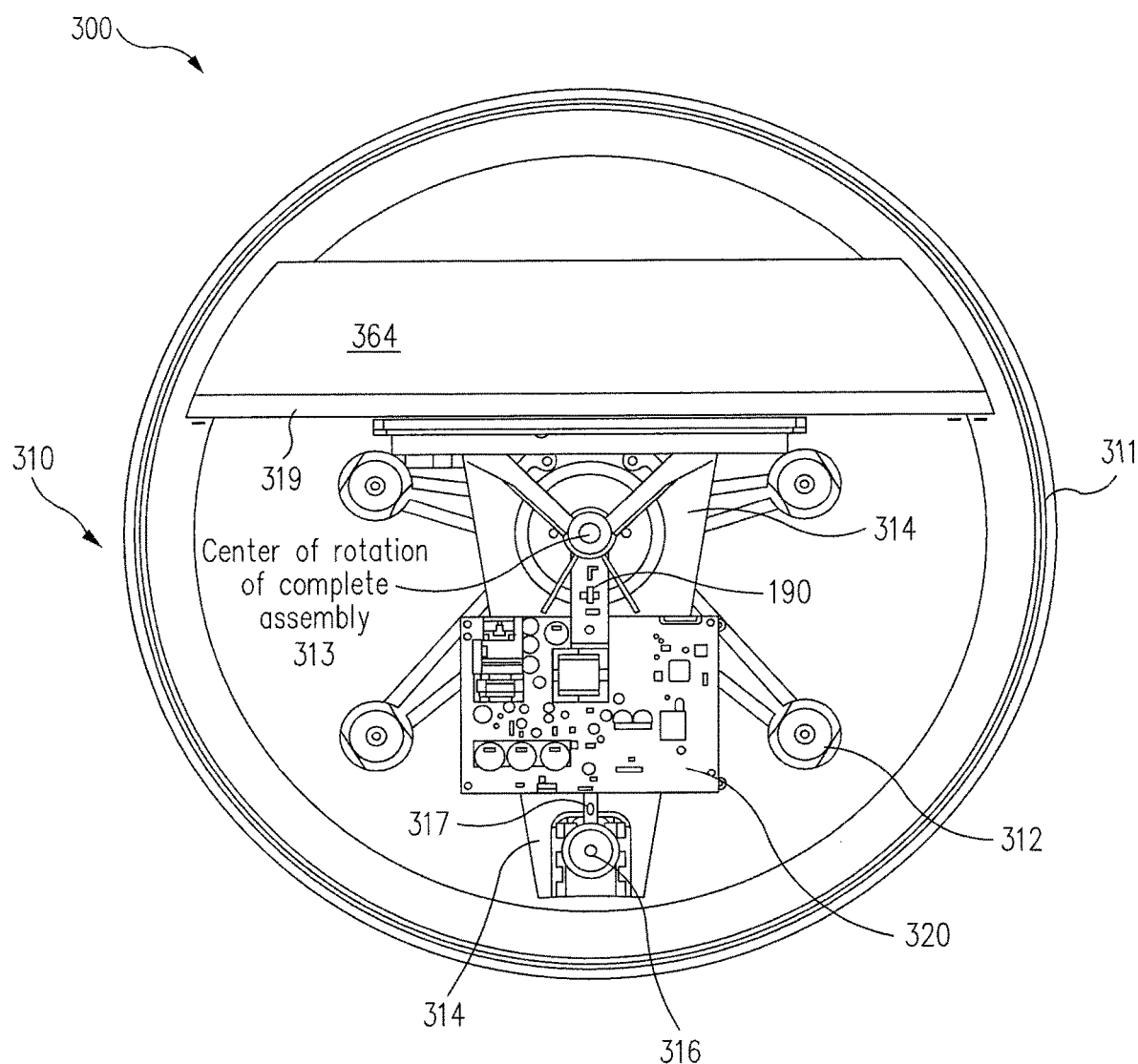
FIG. 3 illustrates a diagram of a ranging system in accordance with an embodiment of the disclosure.

FIG. 3 illustrates a diagram of a ranging system 300 in accordance with an embodiment of the disclosure. In the embodiment shown in FIG. 3, ranging system 300 is implemented as a radar system including a radar assembly 310, housing 311, and multichannel transducer 364 (e.g., a multichannel radar antenna) shielded from system controller 320 and OPS 190 by shielding 319, which correspond to and/or may be implemented similarly to transducer assembly 210, housing 211, multichannel transducer 250, controller 220, OPS 190, and shielding 219 of FIG. 2, respectively. Also shown are sensing platform 314 and platform actuator 316 configured to rotate multichannel transducer 364, shielding 319, controller 320, and OPS 190 about axis 313, and transducer angle sensor 317 configured to measure an angle between an orientation of multichannel transducer 364 and a longitudinal axis of housing 311 (e.g., a vertical line passing perpendicularly through the sensing surface in the orientation shown in FIG. 3). In various embodiments, OPS 190 may be configured to determine an orientation and/or position of ranging system 300 while sensing platform 314 is rotating within housing 311.

In some embodiments, transducer angle sensor 317 may be configured to monitor a position of platform actuator 316, for example, and derive the measured angle from the monitored position. In other embodiments, transducer angle sensor 317 may be configured to detect passage over one or more indexed posts 312 corresponding to a known orientation of multichannel transducer 364 relative to a longitudinal axis of housing 311. Controller 320 may be configured to receive a measured angle corresponding to a particular known relative orientation when transducer angle sensor 317 passes over the appropriate indexed post 312.

In general, transducer assemblies 210 and 310 of FIGS. 2A and 3 may be used to implement a variety of different types of ranging systems, including sonar, radar, and lidar systems, for example, and/or other ranging systems that can benefit from the use of multichannel transducers (e.g., multichannel ranging transmitter and/or sensor/receiver arrays) to range objects/targets. As noted herein, ranging systems incorporating conventional two dimensional multichannel transducers are able to provide two dimensional beam steering, which can facilitate relatively fast two and three dimensional ranging/imaging of an environment, but such systems typically require processing and circuitry supporting a reception or transmitter channel for each element of the two dimensional multichannel transducer, which can be relatively costly and complex to manufacture and operate reliably.

Multichannel transducers designed for beamforming/electrical steering in ranging systems are typically implemented with transducer elements spaced from one another by at most approximately half a wavelength of the primary or average carrier frequency emitted by the transducer elements (e.g., an operating wavelength for the multichannel transducer and/or associated ranging system). Such spacing ensures that grating lobes (also known as diffraction secondaries and alias beams) are not generated over a desired range of available electrical steering angles. If elements are simply removed from the multichannel transducer, the spacing between elements can approach or exceed a full operating wavelength, which introduces grating lobes and related interferences into the ranging system returns that are detrimental to the general performance of the ranging system. When ranging sensor returns include such grating lobes, unwanted targets may be detected within the grating lobes and interpreted as coming from the direction of the primary steered beam. Noise and reverberation and other signal interference may also be picked up by the grating lobes, which reduces the signal to noise of the beamforming ranging system.

As discussed in detail herein, embodiments of the present disclosure include ranging systems with multichannel transducers implemented with staggered arrangements of transducer elements in order to reduce the total number of channels, as compared to conventional full two dimensional arrays. The transducer element arrangements for the transmitter and receiver transducers may be different and configured to mismatch the angular positions of respective grating lobes (e.g., generated by the staggered arrangements) so that the effective combined ranging signal returns do not include the grating lobes and/or the associated detrimental effects of the grating lobes. Thus, the staggered arrangements suppress or eliminate the grating lobes while allowing for reduction of the number of channels used in the ranging system multichannel transducer, which helps reduce the manufacturing cost and complexity of the ranging system as a whole.

Figure 4B:
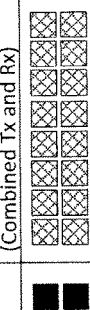

FIGS. 4A-B show respective Tables 1 and 2 illustrating simulated directivity responses associated with different transducer element arrangements for a multichannel transducer of a ranging system in accordance with embodiments of the disclosure. The first four columns of both tables include intensity plots representing the spatial radiation distributions (e.g., transmitted and/or received signal energy distributions) of corresponding transducer element arrangements depicted in the fourth column (Table 1) or the fourth and fifth columns (Table 2) and electronically steered according to the horizontal and vertical angles identified in the corresponding column headers.

The shading in each intensity plot in Tables 1 and 2 represents the varying intensity of the response as a function of horizontal and vertical angle relative to an orientation of the corresponding transducer element arrangement. The horizontal and vertical axes of each intensity plot are aligned with the horizontal and vertical axes of the depiction of its corresponding transducer element arrangement(s). Table 1 shows directivity responses for transmitter or receiver transducer element arrangements, and Table 2 shows the combined or effective directivity responses resulting from a combination of the directivity responses for the corresponding transmitter and receiver transducer element arrangements.

The transducer element arrangements simulated in Tables 1 and 2 are subject to the following parameters (dimensions in operating wavelengths): element width=0.4, element height=0.5, default center to center separation between elements (horizontal and vertical)=0.5, baffle response with −3 dB at ±50° and −20 dB at ±90°. Direction 465 corresponds to a longitudinal axis (e.g., a long axis) of each transducer element arrangement, and direction 445 corresponds to a lateral axis (e.g., a short axis perpendicular to longitudinal axis 465) of each transducer element arrangement. Each transducer element arrangement may be planar, for example, or may be symmetrically curved along its longitudinal and/or lateral axis relative to a center of the transducer element arrangement.

Table 1, row (a) of FIG. 4A illustrates directivity responses for a conventional close packed (e.g., spaced equal to or less than approximately 0.5 operating wavelengths) linear array of transducer elements. As shown in the last column of row (a), the transducer element arrangement may be configured either as a transmitter or a receiver. In this example, eight transducer elements corresponding to eight channels are arranged and aligned along longitudinal direction 465 of the transducer element arrangement. The corresponding directivity responses show that a transducer element arrangement with a single linear row of transducer elements can provide beam steering at 0, 30, and 60 degrees in a plane parallel to its longitudinal axis (e.g., though with an emerging grating lobe when steered to 60 degrees), but does not provide beam steering out of that plane.

For simplicity, beam steering in the plane parallel to a longitudinal axis of a transducer element array and perpendicular to its emission surface(s) will be referred to as horizontal beam steering (e.g., corresponding to direction 465), and beam steering in the plane perpendicular to the horizontal steering plane and the emission surface(s) will be referred to as vertical beam steering (e.g., corresponding to direction 445).

Table 1, row (b) of FIG. 4A illustrates directivity responses for a conventional two dimensional linear array of transducer elements that can be configured to provide vertical discrimination/steering. The transducer element arrangement may be configured either as a transmitter or a receiver. In this example, 16 transducer elements corresponding to 16 channels are arranged and aligned in two parallel rows along longitudinal direction 465. The corresponding directivity responses show that a transducer element arrangement with double horizontal rows of transducer elements may provide relatively localized/narrow horizontal beam steering at 0, 30, and 60 degrees and vertical beam steering at 20 degrees (e.g., though with an emerging grating lobe when steered to horizontal 60 degrees or vertical 20 degrees), as shown in the fourth column of row (b).

Table 1, row (c) of FIG. 4A illustrates directivity responses for a laterally staggered transducer element arrangement roughly corresponding to the conventional two dimensional linear array of row (b) but with eight transducer elements removed. The laterally staggered transducer element arrangement may be configured either as a transmitter or a receiver. In this example, eight transducer elements corresponding to eight channels are arranged along longitudinal direction 465 in a laterally staggered and/or bilaterally symmetric pattern. In particular, counting from the left side of the array, the second, fourth, fifth, and seventh elements are offset along lateral direction 445 from the first, third, sixth, and eighth elements.

In this example, the lateral offset distances for each of the latterly offset transducer elements in the laterally staggered transducer element arrangement is approximately the lateral height of one transducer element, or approximately 0.5 operating wavelengths. In other embodiments, various offset distances may be used based on the specific application to optimize response quality, as described further herein. In general, such offset distances may be between approximately 0.2 and 1.5 operating wavelengths or larger, including 0.25 or 0.5 operating wavelengths, and in some embodiments such offset distances may be varied across a length or width of a particular transducer element arrangement. In particular embodiments, a laterally staggered transducer element arrangement may be bilaterally symmetric, such that the laterally staggered pattern of a first contiguous half of the transducer elements of the transducer element arrangement is mirrored by a second and separate contiguous half of the transducer elements of the transducer element arrangement, similar to that shown in row (c).

The corresponding directivity responses show that a laterally staggered transducer element arrangement may provide horizontal beam steering at 0, 30, and 60 degrees and vertical beam steering at 20 degrees, but can suffer from relatively severe grating lobes. An advantage of the laterally staggered transducer element arrangement presented in Table 1, row (c) is that it uses half as many elements as the conventional two dimensional linear array in Table 1, row (b), thereby reducing manufacturing complexity and cost. Further, the laterally staggered transducer element arrangement provides horizontal and vertical beam steering (e.g., for its primary beam) similar to that provided by the conventional two dimensional linear array in Table 1, row (b), while'using the same number of elements as the conventional one dimensional linear array in Table 1, row (a), which has no vertical discrimination/beam steering. The effective element spacing along the longitudinal axis of the laterally staggered transducer element arrangement of row (c) is the same as for the linear arrays of rows (a) and (b) and will therefore avoid generating grating lobes in the horizontal plane. However, as is apparent from the corresponding directivity responses, the laterally staggered transducer element arrangement of row (c), by itself, suffers from relatively severe out of plane grating lobe artifacts.

Table 1, row (d) of FIG. 4A illustrates directivity responses for a longitudinally staggered transducer element arrangement roughly corresponding to the conventional one dimensional linear array of row (a) but with four transducer elements removed, resulting in a linear array of transducer elements widely spaced along longitudinal direction 465. In this example, four receiver elements corresponding to four channels are arranged along longitudinal direction 465 in a longitudinally staggered and/or bilaterally symmetric pattern. In particular, the transducer elements of the longitudinally staggered transducer element arrangement are longitudinally spaced approximately a full operating wavelength apart. Such longitudinal spacing between longitudinally adjacent transducer elements may range from approximately 1 to 5 operating wavelengths or larger, for example, and may be constant or variable across the longitudinally staggered transducer element arrangement. The corresponding directivity responses show that the longitudinally staggered transducer element arrangement produces substantial grating lobes for horizontal beam steering at 0, 30, and 60 degrees, and is unable to provide vertical beam steering.

As noted above, Table 2 shows the combined or effective directivity responses resulting from a combination of the directivity responses for the corresponding transmitter and receiver transducer element arrangements. Receiver elements are illustrated as solid/filled squares, transmitter elements are illustrated as blank squares, and combined elements (transducer elements wired/configured to act as both transmitters and receivers) are illustrated as crosshatched squares, as shown in Table 2. To produce the directivity responses of Table 2, the transmitter and the receiver arrays for a particular transducer element arrangement are steered in the same direction, thus ensonifying/irradiating and interrogating the same desired volume (e.g., which can be used advantageously to avoid unwanted targets and noise, as described herein).

Table 2, row (a) of FIG. 4B illustrates combined directivity responses for two dimensional linear arrays of transmitter and receiver elements. As shown in the fifth column of row (a), the arrays of transmitter and receiver elements may be arranged in two separate two dimensional linear arrays arranged along longitudinal direction 465 (e.g., for a total of 32 elements), or, as shown in the sixth column of row (a), in a response-equivalent single combined two dimensional linear array arranged along longitudinal direction 465 (e.g., for a total of 16 elements), each of which may correspond to a total of 32 separate transmitter and receiver channels or at least 16 combined transmitter and receiver channels. The corresponding combined directivity responses show that the transducer element arrangements of row (a) may provide relatively localized/narrow horizontal beam steering at 0, 30, and 60 degrees and vertical beam steering at 20 degrees, with minimal or no grating lobes (e.g., compare to Table 1(b)).

Table 2, row (b) illustrates combined directivity responses for a simpler and therefore cheaper transducer element arrangement including a one dimensional linear transmitter array and a two dimensional linear receiver array. The transmitter array is used to ensonify/irradiate a relatively wide volume that is then interrogated by the receiver array to locate targets. As shown in the fifth column of row (b), the arrays of transmitter and receiver elements may be arranged in separate arrays arranged along longitudinal direction 465 (e.g., for a total of 24 elements), or, as shown in the sixth column of row (b), in a response-equivalent single combined two dimensional linear array arranged along longitudinal direction 465 (e.g., for a total of 16 elements), each of which correspond to a total of 24 separate transmitter and receiver channels or at least 16 combined transmitter and receiver channels. The corresponding combined directivity responses show that the transducer element arrangements of row (b) may provide localized/narrow horizontal beam steering at 0, 30, and 60 degrees and vertical beam steering at 20 degrees, with minimal grating lobes, very similar to the results of row (a), but potentially with fewer transmitter channels.

The transducer element arrangements of row (a) and row (b) may both have the advantage of being able to simultaneously interrogate multiple directions within the ensonified/irradiated volume and thus be able to detect targets within the volume and/or generate a 3D scene from a single transmission. Both arrangements exhibit good (e.g., narrow, localized) beam shapes and effectively no out of beam artifacts.

Table 2, row (c) illustrates combined directivity responses for a laterally staggered transducer element arrangement that can be used to ensonify/irradiate and interrogate a volume. As shown in the fifth column of row (c), the transmitter elements and the receiver elements may be arranged along longitudinal direction 465 in a laterally staggered bilaterally symmetric pattern, staggered in the lateral direction 445, such that the transmitter elements and the receiver elements form an interweaved pattern. In particular, the first row includes, from left to right in the longitudinal direction 465, a transmitter element, a receiver element, a transmitter element, two receiver elements, a transmitter element, a receiver element, and a transmitter element. The second horizontal row includes, from left to right in the longitudinal direction 465, a receiver element, a transmitter element, a receiver element, two transmitter elements, a receiver element, a transmitter element, and a receiver element. Thus, certain receiver elements are offset from the other receiver elements in the lateral direction 445 and certain transmitter elements are offset from the other transmitter elements in the lateral direction 445. In this separate transmitter and receiver array embodiment, the eight receiver elements correspond to eight channels and the eight transmitter elements correspond to eight channels, for a total of 16 transmitter and receiver channels, which is less than the total channels for the separate transmitter and receiver embodiments of row (a) or row (b).

The sixth column of row (c) illustrates a response-equivalent transducer element arrangement utilizing combined transmitter and receiver elements. In particular, combined transmitter and receiver elements may be arranged along longitudinal direction 465 in a laterally staggered bilaterally symmetric pattern that is staggered in the lateral direction 445. From left to right, the second, fourth, fifth, and seventh combined elements are offset relatively from the first, third, sixth, and eighth combined elements in the lateral direction 445, similar to the transducer element arrangement of Table 1(c). The eight combined elements correspond to eight combined transmitter and receiver channels, which is less than the total channels for the combined transmitter and receiver embodiments of row (a) or row (b).

The laterally staggered transducer element arrangement in row (c) has advantages similar to those of the transducer element arrangement in row (a) in that it can horizontally and vertically steer both the transmitter array and receiver array, but it suffers from the disadvantage of grating lobe artifacts outside of the main lobe, as can be seen in the corresponding combined directivity responses.

Table 2, row (d) illustrates combined directivity responses for a laterally staggered receiver transducer element arrangement combined with a one dimensional linear transmitter array. As shown in the fifth column of row (d), a row of transmitter elements are aligned along longitudinal direction 465, and a separate set of receiver elements are arranged in a laterally staggered pattern, such that certain receiver elements are offset from the other receiver elements in the lateral direction 445. In this example, the eight transmitter elements correspond to eight transmitter channels, and the eight receiver elements correspond to eight channels, for a total of 16 separate transmitter and receiver channels.

The sixth column of row (d) illustrates a response-equivalent laterally staggered transducer element arrangement with combined transmitter and receiver elements. In particular, from left to right in the longitudinal direction 465, a combined transmitter and receiver element is arranged at a first position, a transmitter element is arranged at a second position with a receiver element offset laterally from the transmitter element, a combined transmitter and receiver element is arranged at a third position, a transmitter element is arranged at a fourth position with a receiver element offset laterally from the transmitter element, a transmitter element is arranged at a fifth position with a receiver element offset laterally from the transmitter element, a combined transmitter and receiver element is arranged at a sixth position, a transmitter element is arranged at a seventh position with a receiver element offset laterally from the transmitter element, and a combined transmitter and receiver element is arranged at an eighth position. Thus, the receiver-only elements are laterally offset from other receiver elements that form combined transmitter and receiver elements. The 12 total transmitter, receiver, and combined transmitter and receiver elements correspond to 12 total transmitter, receiver, and combined transmitter and receiver channels, as shown.

The hybrid transducer element arrangement shown in table 2, row (d), which includes features of both a laterally staggered transducer element arrangement and a one dimensional linear transducer array, may act to reduce or suppress some of the grating lobes evident in Table 2(c) (e.g., a laterally staggered transducer arrangement) by combining linear transmitter elements with staggered receiver elements, as shown. This transducer element arrangement produces directivity responses that are similar to those produced by the transducer element arrangement at Table 1(b), but it requires half the number of transmitter elements/channels and half the number of receiver elements/channels if implemented in separate transmitter and receiver element arrangements, or less than a third of the number of total elements/channels if implemented with combined transmitter and receiver element arrangements. Accordingly, the net result, as shown by the corresponding combined directivity responses, compares favorably with the fully populated arrays shown in Table 2 row (a) and row (b), with a similar main lobe shape and size and substantially suppressed and/or removed out of plane grating lobe artifacts. As can be seen in row (d), embodiments may see a slight increase in side lobe sensitivity, which may increase pickup outside of the main beam compared with the fully populated arrays, but the sensitivities in these side lobes are much lower (e.g., a factor of 10 less) than the main lobe and so can generally be ignored.

Table 2, row (e) illustrates combined directivity responses for a longitudinally staggered receiver transducer element arrangement combined with a one dimensional linear transmitter array. As shown in the fifth column of row (e), a first row of receiver elements are arranged in a linear array of transducer elements widely spaced along longitudinal direction 465 in a longitudinally staggered and/or bilaterally symmetric pattern, and a second row of transmitter elements are arranged in a one dimensional array along longitudinal direction 465. In this example, the four receiver elements correspond to four channels and the eight transmitter elements correspond to eight channels, for a total of 12 channels. No response-equivalent combined transmitter/receiver embodiment is provided in Table 2, but in some embodiments, the transmitter and receiver elements may be combined to produce a transmitter element arrangement having similar directivity response characteristics and employing a total of 8 channels, 4 of which are combined transmitter and receiver channels. The hybrid transducer element arrangement shown in table 2, row (e), which includes features of both a longitudinally staggered transducer element arrangement and a one dimensional linear transducer array, has directivity responses similar to those of the transducer element arrangement of row (d), with potentially fewer transducer elements and channels, but it does not provide vertical discrimination/beam steering.

A ranging system employing a de-populated and/or longitudinally/laterally staggered transducer element arrangement for a multichannel transducer, such as those described above in reference to Tables 1 and 2, may be configured to generate instantaneous 2D and/or 3D ranging data corresponding to an ensonified/irradiated volume from a single transmission. This is possible because embodiments provide an electrically steerable multichannel transducer, and embodiments advantageously provide such features with reduced system components, as compared with traditional fully populated, spaced, and/or otherwise arranged arrays that require a full two dimensional form with numerous transmitters, receivers and associated conditioning and processing circuitry. Similar techniques and structures may be used with various different types of ranging systems, including sonar, radar, lidar, and/or other ranging systems.

With regard to positioning and spacing of transducer elements, for a plane array with a single direction of electrical steer, the position of diffraction secondaries (grating lobes) may be calculated from the following equation:

$$\text{Diffraction Secondary Angle} = \sin^{-1}\left(n * \frac{\text{wavelength}}{\text{spacing}} + \sin(\text{Steer Angle})\right)$$

where "spacing" is the distance between element centers within the array, and where "n" is the diffraction secondary number (with n=0 referring to the main/primary lobe).

By selecting a different element spacing for the receiver transducer element arrangement, as compared to the transmitter transducer element arrangement, the diffraction secondaries may be positioned so that they do not overlap and are therefore relatively attenuated. For example, when the element spacing is set to a half operating wavelength, there are no diffraction secondaries unless the steer angle is ±90°, in which case the diffraction secondaries occur at ±90°, as can be seen in the directivity responses at Table 1(a).

A transducer element arrangement similar to that of Table 1(a) can be selected as the transmitter transducer element arrangement because, as shown in Table 1(a), it will not have diffraction secondaries, and so substantially all of the transmission power will be concentrated in the main lobe. The receiver elements may therefore have a wider spacing; the spacing chosen for the transducer element arrangement of Table 1, row (d) may be set to maintain a particular multichannel transducer length while halving the number of channels. The result of combining these two transducer element arrangements may be seen in Table 2, row (e) and may be compared to the fully populated equivalent in Table 2, row (b). The directivity responses compare favorably for the transducer element arrangement of Table 2(e), with a similar main lobe shape and size and suppression of unwanted diffraction secondaries (e.g., compare Table 1(d)), and with a slight increase in side lobe levels, but with a reduced total number of transducer elements and/or channels and corresponding transducer assembly cost and complexity.

With regard to the selection of the relative spacings of hybrid transducer element arrangements, if two different transducer element arrangements that each produce diffraction secondaries are combined to form a single multichannel transducer, then, in general, the relative spacings should not be whole multiples of each other, because such spacings will cause their diffraction secondaries to overlay and enhance each other. For example, consider a hybrid transducer element arrangement including first and second transducer element arrangements, where the first transducer element arrangement has an element spacing twice that of the second transducer element arrangement. The second diffraction secondary of the (relatively) longitudinally staggered transducer element arrangement will overly the first diffraction secondary of the other transducer element arrangement, in which case the two diffraction secondaries will not be attenuated.

Figure 5A:
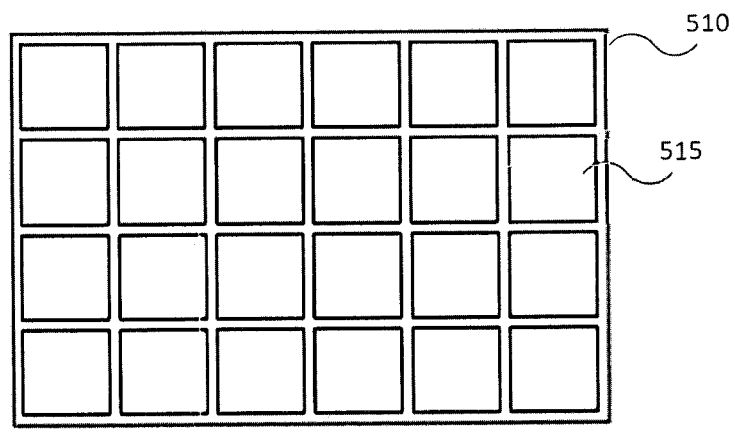
FIGS. 5A-5C illustrate multichannel transducers with various transducer element arrangements in accordance with embodiments of the disclosure.
Figure 5B:
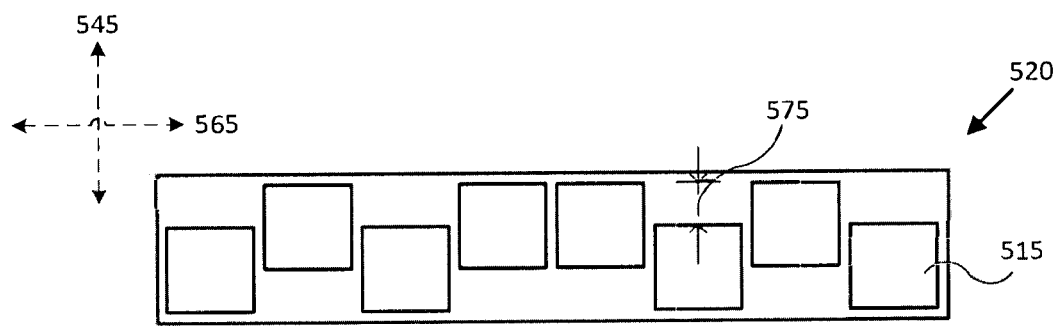
Figure 5C:
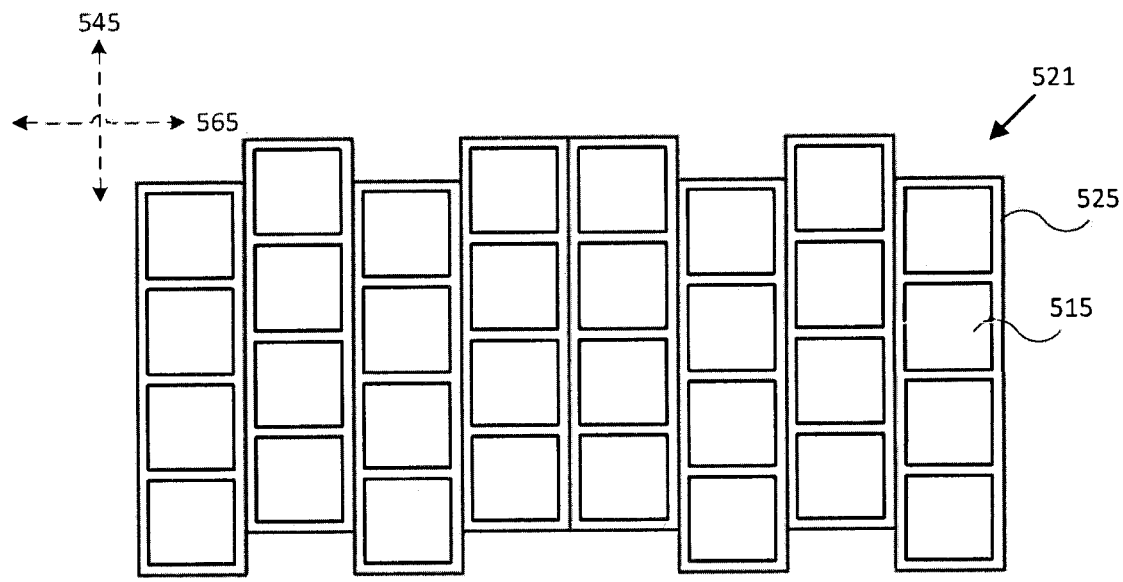

In a ranging system implemented as a radar system, such as system 300 of FIG. 3, a laterally staggered transducer element arrangement similar to those described above may provide good angular accuracy/discrimination/beam steering in a main plane (e.g., azimuth) and a second plane (e.g., elevation), thereby providing two dimensional beamforming, while reducing the total number of transducer elements and/or channels needed to implement the corresponding multichannel transducer, as described herein. FIGS. 5A-5C illustrate multichannel transducers with various transducer element arrangements in accordance with embodiments of the disclosure.

Traditionally, to perform two dimensional beamforming, a conventional two dimensional array 510 of transducer elements 515 is used, as shown in FIG. 5A. High resolution two dimensional beamforming conventionally requires a large number of transducer elements 515, and because each transducer element 515 is individually accessed, complex electronic circuitry and a large amount of processing power is also required. With such conventional systems, shaping the beam even in one dimension (e.g., usually in elevation) requires many transducer elements in that dimension, which undesirably increases system cost.

Further, as noted herein, to perform beamforming in any plane without generating grating lobes conventionally requires that the spacing between adjacent transducer elements, in the plane dimension, be less than a fraction of an operating wavelength (e.g., usually less than between 0.5 and 1 operating wavelengths). Single radiating elements are often used because of these spacing constraints. This also puts constraints on the associated electronic circuits and requires significant processing power because of the conventionally required large number of transducer elements.

As shown in FIG. 5B, embodiments of the present disclosure substantially eliminate these traditional constraints by employing a staggered multichannel transducer 520 with a transducer elements 515 that are offset (e.g., staggered) in the plane perpendicular to a longitudinal axis (e.g., corresponding to direction 565) of multichannel transducer 520. For example, in multichannel transducer 520, transducer elements 515 are offset from each other in a lateral direction 545 perpendicular to longitudinal direction 565, within the plane generally encompassing transducer elements 515. In particular, from left to right in the longitudinal direction 565, the second, fourth, fifth, and seventh transducer elements 515 are relatively offset relatively from the first, third, sixth, and eighth transducer elements 515 in the lateral direction 545, similar to the laterally staggered transducer element arrangements depicted in Tables 1 and 2 of FIGS. 4A-B. The eight transducer elements 515 correspond to eight different channels. The lateral offset distance 575 may be approximately half the height/diameter of transducer element 515.

In various embodiments, multichannel transducer 520 may be formed according to a planar transducer element arrangement, for example, or a curved transducer element arrangement, one or more planar transducer element arrangements (each according to a different plane), and/or other general shapes or surfaces for multichannel transducer 520.

The laterally staggered transducer element arrangement of multichannel transducer 520 allows a ranging system employing multichannel transducer 520 to perform two dimensional beamforming, as described herein. The advantages of staggered multichannel transducer 520 may include a reduced number of elements, which simplifies electronics and signal processing requirements while beam steering accuracy along longitudinal direction 545 (e.g., usually corresponding to azimuth) is largely preserved, as compared to ranging systems utilizing fully populated two dimensional multichannel transducers. At the same time, the ability to resolve angular positions of targets along lateral direction 545 (e.g., usually corresponding to elevation) is a tremendous benefit. Because transducer elements 515 are arranged substantially in a linear array, the staggered transducer element arrangement of multichannel transducer 520 also provides for narrower beamwidth and higher angular accuracy for a given number of total array elements 515. As well, the relatively low number of total elements 515 results in less electronics and significantly reduced processing power needed to operate a ranging system incorporating staggered multichannel transducer 520.

In some embodiments, the individual transducer elements of staggered multichannel transducer 520 may be expanded to include a number of staggered sub-arrays, as shown in more detail in FIG. 5C. For example, staggered multichannel transducer 521 of FIG. 5C includes staggered sub-arrays 525, which may be configured to provide relatively large gain (e.g., by providing additional transducer surface area) and/or specific beam shapes. In general, transducer elements 515 within a particular sub-array 525 may be directly electrically coupled to each other, for example, or may be electrically coupled to each other through one or more gain, attenuator, phase shifting, and/or other transmitter or receiver circuit elements, as described herein. However, each sub-array 525 corresponds to only a single transmitter or receiver channel, as described herein, and so the increased gain and/or specific beam shapes provided by sub-arrays 525 may be realized without substantially increasing the complexity and/or cost of the resulting ranging system, particularly as it relates to beamforming processing.

Performing two dimensional beamforming using a traditional two dimensional array with these relatively large sub-arrays 525 would position them more than several operating wavelengths apart in the sub-array plane, thus resulting in severe grating lobes and ambiguities in the angular position of a detected target in that plane. However, by staggering sub-arrays 525, such negative artifacts may be substantially reduced or suppressed. As shown in FIG. 5C, from left to right along longitudinal direction 565, the second, fourth, fifth, and seventh column of sub-arrays 525 are offset relatively from the first, third, sixth, and eighth column of sub-arrays 525 along lateral direction 545. The eight columns of sub-arrays 525 may correspond to eight different channels. The lateral offset distance may be approximately half of the height of a transducer element 515, for example, and/or may range between approximately 0.2 and 1.5 operating wavelengths, or larger.

In various embodiments, multichannel transducers 520 and/or 521 may include laterally staggered transducer element arrangements, longitudinally staggered transducer element arrangements, hybrid transducer element arrangements, and/or other transducer element arrangements, including all such arrangements described with reference to Tables 1 and 2 of FIGS. 4A-B. More generally, any of the multichannel transducers, transducer element arrangements, sub-arrays, and/or other structures may be used or combined for use with any type of ranging system and/or transmitter or receiver transducer for a ranging system, including ranging systems 100, 101, 200, 201, and/or 300 of FIGS. 1A-3.

Although FIGS. 4A-5C each show individual transducer elements that appear roughly square or rectangular in shape, other shapes for such transducer elements are contemplated, including circular, elliptical, triangular, and/or other symmetric, asymmetric, bisymmetric, or otherwise spatially distributed and/or oriented shapes.

Figure 6:
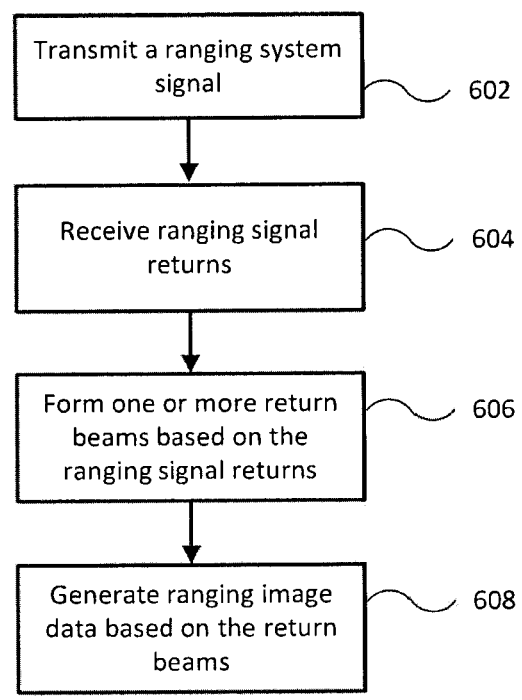
FIG. 6 illustrates a flow diagram of various operations to operate a ranging system with a staggered multichannel transducer in accordance with an embodiment of the disclosure.
Figure 7:
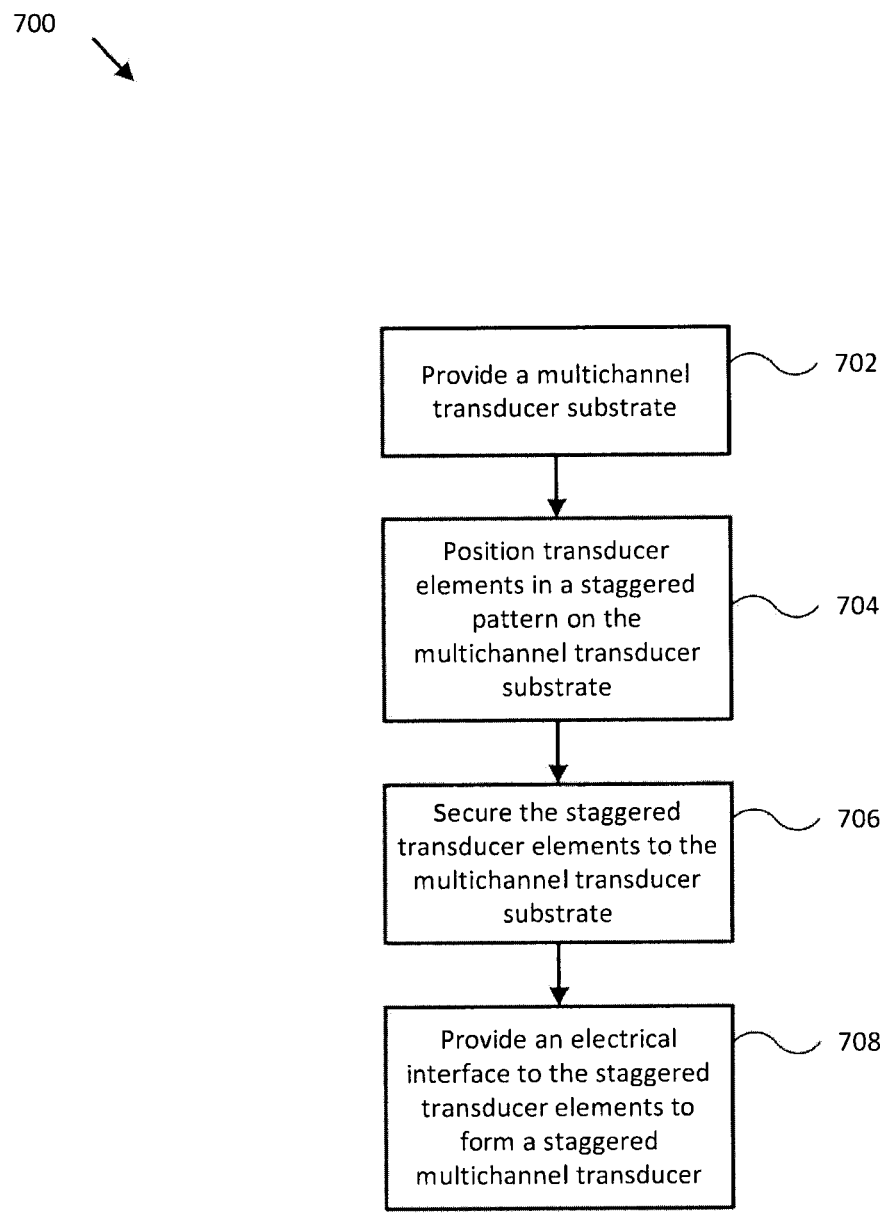
FIG. 7 illustrates a flow diagram of various operations to assemble or manufacture a staggered multichannel transducer for a multichannel ranging system in accordance with an embodiment of the disclosure.

FIG. 6 illustrates flow diagrams of a process 600 to generate ranging data and/or imagery using a staggered multichannel transducer in accordance with embodiments of the disclosure. In some embodiments, the operations of FIG. 6 may be implemented as software instructions executed by one or more logic devices associated with corresponding electronic devices, sensors, and/or structures depicted in FIGS. 1A through 5C. More generally, the operations of FIG. 6 may be implemented with any combination of software instructions and/or electronic hardware (e.g., inductors, capacitors, amplifiers, actuators, or other analog and/or digital components).

It should be appreciated that any step, sub-step, sub-process, or block of process 600 may be performed in an order or arrangement different from the embodiments illustrated by FIG. 6. For example, in other embodiments, one or more blocks may be omitted from the various processes, and blocks from one process may be included in another process. Furthermore, block inputs, block outputs, various sensor signals, sensor information, calibration parameters, and/or other operational parameters may be stored to one or more memories prior to moving to a following portion of a corresponding process. Although process 600 is described with reference to systems 100, 100B, 200, 201, 300 and FIGS. 1A-5C, process 600 may be performed by other systems different from those systems and including a different selection of electronic devices, sensors, assemblies, mobile structures, and/or mobile structure attributes.

Process 600 represents a method for providing ranging data and/or imagery using systems 100, 100B, 200, 201, and/or 300 in accordance with embodiments of the disclosure. At the initiation of process 600, various system parameters may be populated by prior execution of a process similar to process 600, for example, or may be initialized to zero and/or one or more values corresponding to typical, stored, and/or learned values derived from past operation of process 600, as described herein.

In block 602, a logic device transmits a ranging system signal. For example, controller 220 and/or co-controller 222 of transducer assembly 210 may be configured to control transmitter 230 to provide a shaped or unshaped transmission signal to one or more transmitter channels 260 of multichannel transducer 250 and produce a corresponding ranging system beam, such as a beamformed sonar beam or a radar beam. Multichannel transducer 250 may be implemented according to any of the transducer element arrangements provided in Tables 1 or 2 of FIGS. 4A-B and/or FIGS. 5A-C. In some embodiments, controller 220 and/or co-controller 222 may be configured to control transceiver 234 to provide a shaped or unshaped transmission signal to transducer 264 and produce a corresponding ranging system beam. In various embodiments, transducer assembly 210 may be configured to use temperature sensor 266 and/or orientation/position sensor 240 to record corresponding measurements at substantially the same time. Notification of transmission and/or other sensor information or data may be relayed to other devices of system 100 through cable 214.

In block 604, a logic device receives ranging signal returns. For example, controller 220 and/or co-controller 222 may be configured to control one or more of receivers 232 to receive ranging signal returns from one or more of receiver channels 262 of multichannel transducer 250, which may be implemented as a staggered multichannel transducer, for example, and provide the received return signals (e.g., in digital form) to co-controller 222. In other embodiments, controller 220 and/or co-controller 222 may be configured to control transceiver 234 to receive return signals from transducer 264 and provide the received return signals (e.g., in digital form) to co-controller 222. In some embodiments, receivers 232 and/or transceiver 234 may be configured to convey the return signals to co-controller 222 over a baseband channel. In other embodiments, receivers 232, transceiver 234, and/or co-controller 222 may be configured to decimate the return signals before performing further processing. In various embodiments, transducer assembly 210 may be configured to use temperature sensor 266 and/or orientation/position sensor 240 to record corresponding measurements at substantially the same time. Notification of reception and/or other sensor information may be relayed to other devices of system 100 through cable 214. Further, a staggered receiver transducer element arrangement of multichannel transducer 250, potentially in combination with a transmitter transducer element arrangement of multichannel transducer 250, may allow for two dimensional beam forming and/or substantial reduction or suppression of associated grating lobes, as described herein.

In block 606, a logic device forms one or more return beams based on the ranging signal returns received in block 606. For example, controller 220 and/or co-controller 222 may be configured to perform beamforming, interferometry, and/or inter-beam interpolation processing on the ranging signal returns received in block 604 to form the one or more return beams, which may correspond to particular angular positions within a volume ensonified or irradiated by the ranging system. In some embodiments, such processing may be performed on ranging signal returns grouped from two, three, or more receiver channels, for example, depending on the desired number of beams, the desired range of beam orientations, and/or other system configuration parameters. In various embodiments, controller 220 and/or co-controller 222 may be configured to determine an inter-beam angle conversion basis for each sonar return beam, which may be used to determine accurate return beam signal amplitudes as a function of the angle for each return beam, as described herein. In some embodiments, controller 220 and/or co-controller 222 may be configured to decimate, scale, filter, and/or otherwise process or post-process the return beams before storing the amplitudes, inter-beam angles, and/or other characteristics of the return beams (e.g., for each sample) and proceeding to block 608. Notification of processing and/or other sensor information may be relayed to other devices of system 100 through cable 214.

In block 608, a logic device generates ranging image data from the return beams formed in block 606. For example, controller 220 and/or co-controller 222 may be configured to process the individual return beams (e.g., according to their corresponding orientation angles and/or signal amplitudes) into depth/range (e.g., time from transmission to reception), position (e.g., orientation angle for the return beam), and/or intensity (e.g., signal amplitude) data, for each sample. Controller 220 and/or co-controller 222 may be configured to convert such data and/or samples into two dimensional and/or three dimensional ranging imagery and/or display views, as described herein. In some embodiments, controller 220 and/or co-controller 222 may be configured to use corresponding recorded temperature, orientation, and/or position measurements to align ranging signal returns, samples, data, and/or imagery with each other and/or one or more directions, such as down. Ranging data, imagery, display views, and/or other sensor information may be relayed to other devices of system 100 (e.g., user interface 120) through cable 214. In some embodiments, transducer assembly 210 may be configured to display sonar/radar data, imagery, display views, and/or other sensor information to a user through use of user interface 120, for example, such as receiving user selection of a desired display view and then relaying corresponding sonar/radar/ranging data and/or imagery to user interface 120.

It is contemplated that any one or combination of methods to provide sonar/radar data and/or imagery may be performed according to one or more operating contexts of a control loop, for example, such as a startup, learning, running, and/or other type operating context. For example, process 600 may proceed back to block 602 and proceed through process 600 again to produce updated sonar/radar data and/or imagery, as in a control loop.

Process 700 represents a method for manufacturing and/or assembling a staggered multichannel transducer in accordance with embodiments of the disclosure. For example, the staggered multichannel transducer may be formed according to any of the systems and elements described with reference to FIGS. 1A-5C. At the initiation of process 700, various components for a staggered multichannel transducer may be provided. Process 700 may be performed by a technician, an automated assembly machine, or both.

In block 702, a multichannel transducer substrate is provided. The multichannel transducer substrate may include a surface configured support one or more transducer elements. In block 704, transducer elements are positioned on the multichannel transducer substrate in a staggered pattern, similar to one or more examples shown in FIGS. 4A-5C. The relative positions and arrangements of the transducer elements may be determined based on a particular application and/or type or operating characteristics of a particular ranging system.

In block 706, the transducer elements may be secured or coupled to the multichannel transducer substrate via adhesive bonding, soldering, mechanical coupling, moulding, and/or other physical securing mechanism. In block 708, an electrical interface may be provided to each of the transducer elements in order to form a staggered multichannel transducer. For example, electrical wiring may be coupled to each transducer elements to form sub-arrays and/or various staggered transducer element arrangements and provide electrical connectivity for signal transmission and reception by one or more of the stagger transducer elements, as described herein.

Embodiments of the present disclosure thus provide staggered multichannel transducers with staggered transducer element arrangements that improve or provide for increased ranging system performance such as accurate two or three dimensional ranging system data and/or imagery. Such staggered transducer element arrangements also reduce the number of transducer elements/channels needed to generate two or three dimensional ranging system data and/or imagery, which can result in a ranging system transducer assembly that is relatively inexpensive, reliable, and compact. Such embodiments may be used to provide various ranging system functions associated with radar systems, sonar systems, lidar systems, and other ranging systems to assist in navigation and/or mapping for a mobile structure and/or to assist in the operation of other systems, devices, and/or sensors coupled to the mobile structure.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A ranging system comprising:
a transducer assembly; and
a multichannel transducer device coupled to or within the transducer assembly and configured to transmit ranging beams and/or receive ranging signal returns, wherein:
the multichannel transducer device comprises radar, sonar, or lidar transducer elements arranged in a hybrid transducer element arrangement of a first array of transducer elements and a second array of transducer elements;
the first array of transducer elements is arranged according to a staggered transducer element arrangement, wherein:
the first array of transducer elements are bilaterally symmetric relative to one another in a first direction and across a plane extending between adjacent transducer elements, and
each transducer element of the first array of transducer elements is laterally offset, in a second direction orthogonal to the first direction, from at least one adjacent transducer element; and
the second array of transducer elements is arranged in a one dimensional linear array.

2. The ranging system of claim 1, wherein the first array of transducer elements comprises a plurality of sub-arrays that are laterally staggered relative to one another.

3. The ranging system of claim 1, wherein the first array of transducer elements are longitudinally staggered relative to one another.

4. The ranging system of claim 1, wherein:
the first array of transducer elements comprises a first array of receiver transducer elements; and
the second array of transducer elements comprises a second array of transmitter transducer elements.

5. The ranging system of claim 1, wherein:
the first array of transducer elements comprises one or more combined transmitter and receiver transducer elements arranged according to the staggered transducer element arrangement.

6. The ranging system of claim 1, wherein:
the staggered transducer element arrangement comprises a lateral offset distance for each laterally offset transducer element of 0.25 or 0.5 operating wavelengths, wherein the first array of transducer elements are laterally staggered and bilaterally symmetric relative to one another.

7. The ranging system of claim 1, wherein:
the staggered transducer element arrangement comprises a longitudinal spacing between longitudinally adjacent transducer elements of equal to or approximately equal to 1 and 5 operating wavelengths, wherein the first array of transducer elements are longitudinally staggered and bilaterally symmetric relative to one another.

8. The ranging system of claim 1, wherein:
the multichannel transducer device comprises a plurality of sub-arrays each comprising a subset of the first array of transducer elements; and
the plurality of sub-arrays are laterally staggered according to the laterally staggered transducer element arrangement.

9. The ranging system of claim 1, wherein the staggered transducer element arrangement is configured to reduce grating lobes in ranging signal returns received via the multichannel transducer device.

10. The ranging system of claim 1, wherein the transducer elements in the multichannel transducer device are arranged in a curved array and/or one or more planar arrays.

11. The ranging system of claim 1, wherein the ranging system is configured to operate on a mobile structure and wherein the mobile structure is at least one of a drone, a watercraft, an aircraft, a robot, or a vehicle.

12. A method comprising:
receiving ranging signal returns by a multichannel transducer device of a ranging system, wherein:
the multichannel transducer device comprises radar, sonar, or lidar transducer elements arranged in a hybrid transducer element arrangement of a first array of transducer elements and a second array of transducer elements,
the first array of transducer elements is arranged according to a staggered transducer element arrangement, with the first array of transducer elements bilaterally symmetric relative to one another in a first direction and across a plane extending between adjacent transducer elements, and each transducer element of the first array of transducer elements laterally offset, in a second direction orthogonal to the first direction, from at least one adjacent transducer element, and
the second array of transducer elements is arranged in a one dimensional linear array;
forming one or more return beams based, at least in part, on the ranging signal returns; and
generating ranging image data based, at least in part, on the return beams.

13. The method of claim 12, wherein the first array of transducer elements comprises a plurality of sub-arrays that are laterally staggered relative to one another.

14. The method of claim 12, wherein the first array of transducer elements are longitudinally staggered relative to one another.

15. The method of claim 12, wherein:
the first array of transducer elements comprises a first array of receiver transducer elements; and
the second array of transducer elements comprises a second array of transmitter transducer elements.

16. The method of claim 12, wherein:
the multichannel transducer device comprises a plurality of sub-arrays each comprising a subset of the first array of transducer elements; and
the plurality of sub-arrays are laterally staggered according to the laterally staggered transducer element arrangement.

17. The method of claim 12, wherein the staggered transducer element arrangement is configured to reduce grating lobes in ranging signal returns received via the multichannel transducer device.

18. The method of claim 12, wherein the multichannel transducer device is arranged in a curved array and/or one or more planar arrays.

19. The method of claim 12, wherein the ranging system is configured to operate on a mobile structure and wherein the mobile structure is at least one of a drone, a watercraft, an aircraft, a robot, or a vehicle.

20. A method comprising:
providing a multichannel transducer device substrate;
positioning a first array of transducer elements according to a staggered pattern on the multichannel transducer device substrate, wherein the first array of transducer elements are radar, sonar, or lidar transducer elements, and wherein the first array of transducer elements are:
bilaterally symmetric relative to one another, and
laterally or longitudinally staggered;
positioning a second array of transducer elements in a one dimensional (1D) linear array on the multichannel transducer device substrate;
securing the first array of transducer elements to the multichannel transducer device substrate in the staggered pattern;
securing the second array of transducer elements to the multichannel transducer device substrate in the 1D linear array; and
providing electrical interfaces to the first array of transducer elements and the second array of transducer elements.

* * * * *

UNITED STATES PATENT AND TRADEMARK OFFICE
CERTIFICATE OF CORRECTION

| | |
|---|---|
| PATENT NO. | : 11,531,083 B2 |
| APPLICATION NO. | : 16/690308 |
| DATED | : December 20, 2022 |
| INVENTOR(S) | : Paul Stokes, Patrick Lamontagne and Pierre Poitevin |

It is certified that error appears in the above-identified patent and that said Letters Patent is hereby corrected as shown below:

In the Specification

In the Detailed Description:

Column 23, Line 30, change "by the amountand polarity" to --by the amount and polarity--.

Signed and Sealed this
Seventh Day of February, 2023

Katherine Kelly Vidal
*Director of the United States Patent and Trademark Office*